March 22, 1960 G. G. LIGHT 2,929,864
TELEGRAPH SYSTEM
Filed Aug. 25, 1955 15 Sheets-Sheet 1

INVENTOR.
G. G. LIGHT
BY M. R. Marsh
ATTORNEY

March 22, 1960  G. G. LIGHT  2,929,864
TELEGRAPH SYSTEM
Filed Aug. 25, 1955  15 Sheets-Sheet 4

INVENTOR.
G. G. LIGHT
BY
*G. R. Marsh*
ATTORNEY

March 22, 1960  G. G. LIGHT  2,929,864
TELEGRAPH SYSTEM
Filed Aug. 25, 1955  15 Sheets-Sheet 9

INVENTOR.
G. G. LIGHT
BY
ATTORNEY

March 22, 1960

G. G. LIGHT 2,929,864

TELEGRAPH SYSTEM

Filed Aug. 25, 1955

INVENTOR.
G. G. LIGHT

BY

ATTORNEY

March 22, 1960

G. G. LIGHT 2,929,864

TELEGRAPH SYSTEM

Filed Aug. 25, 1955

INVENTOR.
G. G. LIGHT
BY
*H. R. Marsh*
ATTORNEY

United States Patent Office 2,929,864
Patented Mar. 22, 1960

2,929,864

TELEGRAPH SYSTEM

George G. Light, Scarsdale, N.Y., assignor to The Western Union Telegraph Company, New York, N.Y., a corporation of New York Application August 25, 1955, Serial No. 530,571

20 Claims. (Cl. 178—2)

The present invention relates generally to telegraph systems and more particularly to a duplex operated telegraph system.

Many telegraph stations do not have sufficient business to economically justify separate circuits to a central relay office or switching center, and in such cases it is the usual practice to connect a number of these stations to a central office by a single party line circuit or so-called way station circuit. In these cases it is desirable that each station be capable of individually transmitting to the central office and that the central office be able to selectively call and transmit to any one of the stations. In this connection the features of the present invention are directed to the arrangement whereby the way circuit is operated on a duplex basis wherein a way station may transmit a message to the central office while the central office is transmitting another message to the same or another station on the way circuit.

It is therefore one of the primary objects of the present invention to provide a new and improved arrangement for operating a way circuit on a duplex basis and wherein a minimum of equipment is employed to perform the necessary selective operations.

Another object of the present invention is to provide a duplex operated way circuit wherein no spurious characters are recorded on the recording equipment at the central office or at any of the way stations and wherein the employment of precision start-stop type equipment for the reception of the control signals at the way stations or central office is not necessary.

Another object of the present invention is to provide a duplex operated way circuit arrangement that does not require in the control signals long opens or open line conditions of greater length than the length of one character signal whereby any type of telegraph repeater may be employed on the way circuit.

Still another object of the present invention is to provide a duplex operated way circuit wherein a message priority system is employed so that a station having a high priority message transmits the same before a low priority message is transmitted from another station.

In this connection a still further object of the present invention is to provide an arrangement embodying the above feature and wherein each station is given a chance to transmit in turn so that no station can seize the way circuit to transmit a number of messages when one or more of the other stations on the circuit have messages of the same priority to transmit.

Still another object of the present invention is to provide a duplex operated system wherein the use of the circuit by any one of the way stations is controlled by equipment at the central office which is initiated into the cycle of operation by requests from the way stations when they have messages to transmit.

In this connection a further object of the present invention is to provide a system with the above arrangement wherein cycling signals from the central office are only transmitted to the way circuit when one or more of the way stations have a message to transmit to the central office. By this arrangement any message that is being transmitted to a way station is not interrupted to transmit station cut-in signals unless one of the stations has a message for the central office.

The above and further objects and features of the present invention will be more apparent hereinafter in the following detailed description of an illustrative embodiment thereof wherein reference is made to the accompanying drawings, in the latter of which:

Fig. 16 illustrates the manner in which Figs. 2 and 3 may be associated to form a complete circuit; and Fig. 17 illustrates the manner in which Figs. 4 to 15 may be associated to form a complete circuit.

Figure 1:
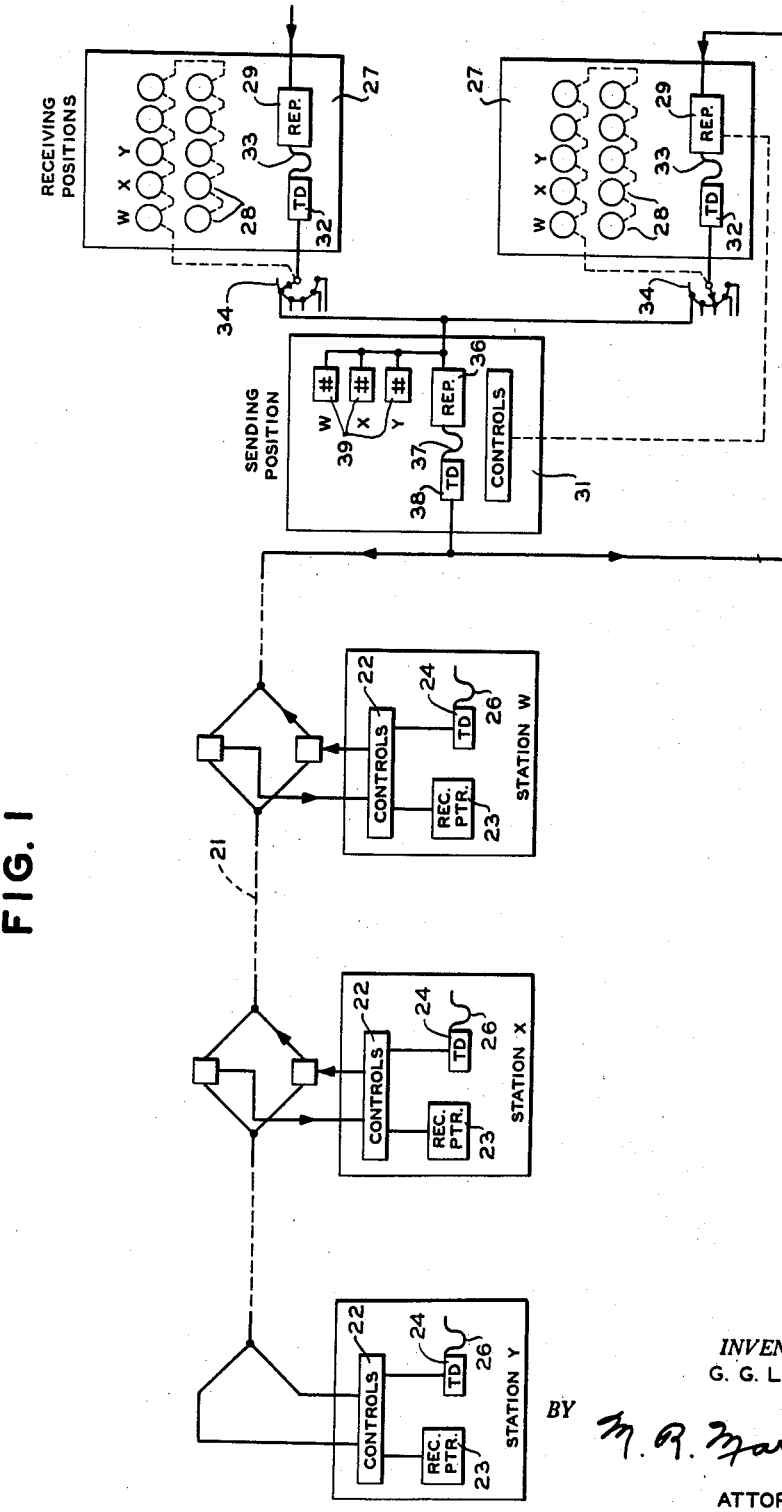
Fig. 1 is a block diagram of a way circuit embodying the principles of the present invention.

Referring now to the drawings, Fig. 1 illustrates in block or diagrammatic form the manner in which the principles of the invention may be applied to a duplex operated way circuit connecting a plurality of way stations to a central station or switching office. In Fig. 1, the way circuit is identified by reference numeral 21 and connects way stations W, X and Y to the switching center. Each way station has a set of controls 22 for controlling the station equipment thereat, a receiving printer 23 and a tape transmitter 24. The invention is described herein in connection with a system using torn tape at the way stations wherein messages appear in individual sections of a tape 26 and are fed into the transmitter 24 one at a time. It will be obvious that if desired other arrangements for handling messages originating at a way station could be provided such as, for example, a keyboard transmitting directly to the line or a keyboard perforator preparing a perforated tape feeding directly to the transmitter 24.

The system of the present invention may be employed in conjunction with a so-called push button switching system at the central office wherein messages received thereat are directed to the proper remote stations by means of push buttons.

In Fig. 1 two receiving positions 27 are illustrated with each having a set of destination indicating push buttons 28 for directing messages received on reperforators 29 to proper sending positions such as 31. Each receiving position 27 in addition to a reperforator 29 and a set of destination indicating push buttons 28 has a tape transmitter 32 controlled by an individual tape 33 issuing from the associated reperforator 29.

The push buttons 28 control rotary switches 34 to connect the receiving positions to the desired sending positions such as 31. The sending positions include a reperforator 36 for preparing a tape 37 in accordance with signals transmitted thereto and an associated transmitter 38. In the sending position for the way circuit 21 there is also included a numbering machine 39 for each of the way stations on the way circuit. These numbering machines function to sequentially number each message transmitted to a particular way station and to also insert ahead of the message one or more characters to cause a particular way station to be selected to the exclusion of the others in accordance with which station the message is intended for.

With the above general description of the equipment and arrangement in mind, the operation of the circuits will now be described in detail, first in conjunction with the transmission of a message from a way station to the switching center and subsequently in conjunction with the transmission of a message from the switching center to a particular one of the way stations.

Sending message from way station

The operation of some of the circuits and equipment at a way station will now be described in connection with a message originating thereat which is to be transmitted to the central office. It is assumed that for certain operational purposes each way station originating message starts with the characters ZCZC and terminates with four N's. It will further be assumed that each way station sends one message at a time on a torn tape basis, and that by means of an automatic numbering machine, which may be of the type disclosed in U.S. Patent No. 2,193,809, each message is preceded by a sequence number.

Figure 2:
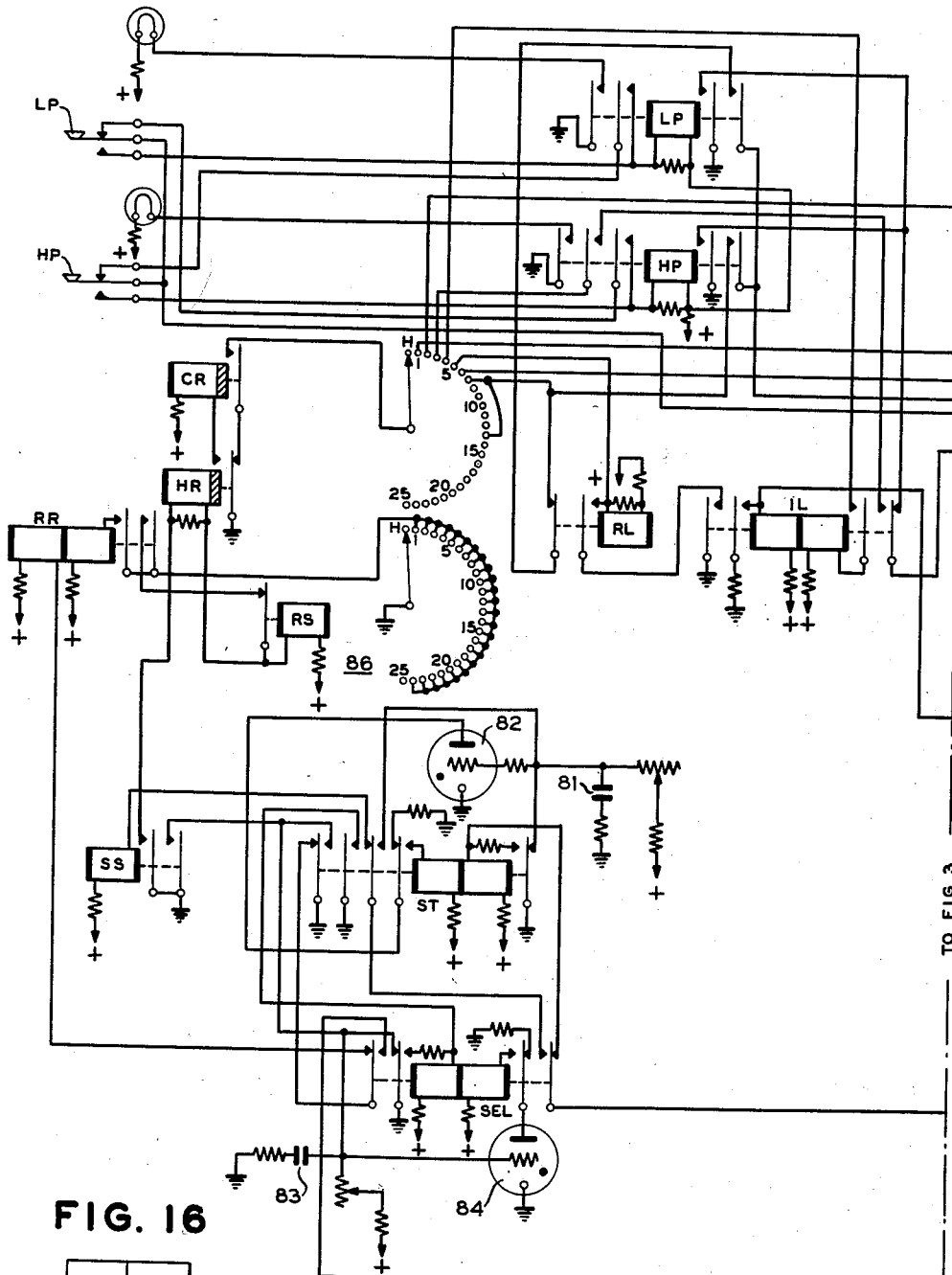
Figs. 2 and 3 are drawings of the circuits interconnecting various items of equipment at a way station.
Figure 3:
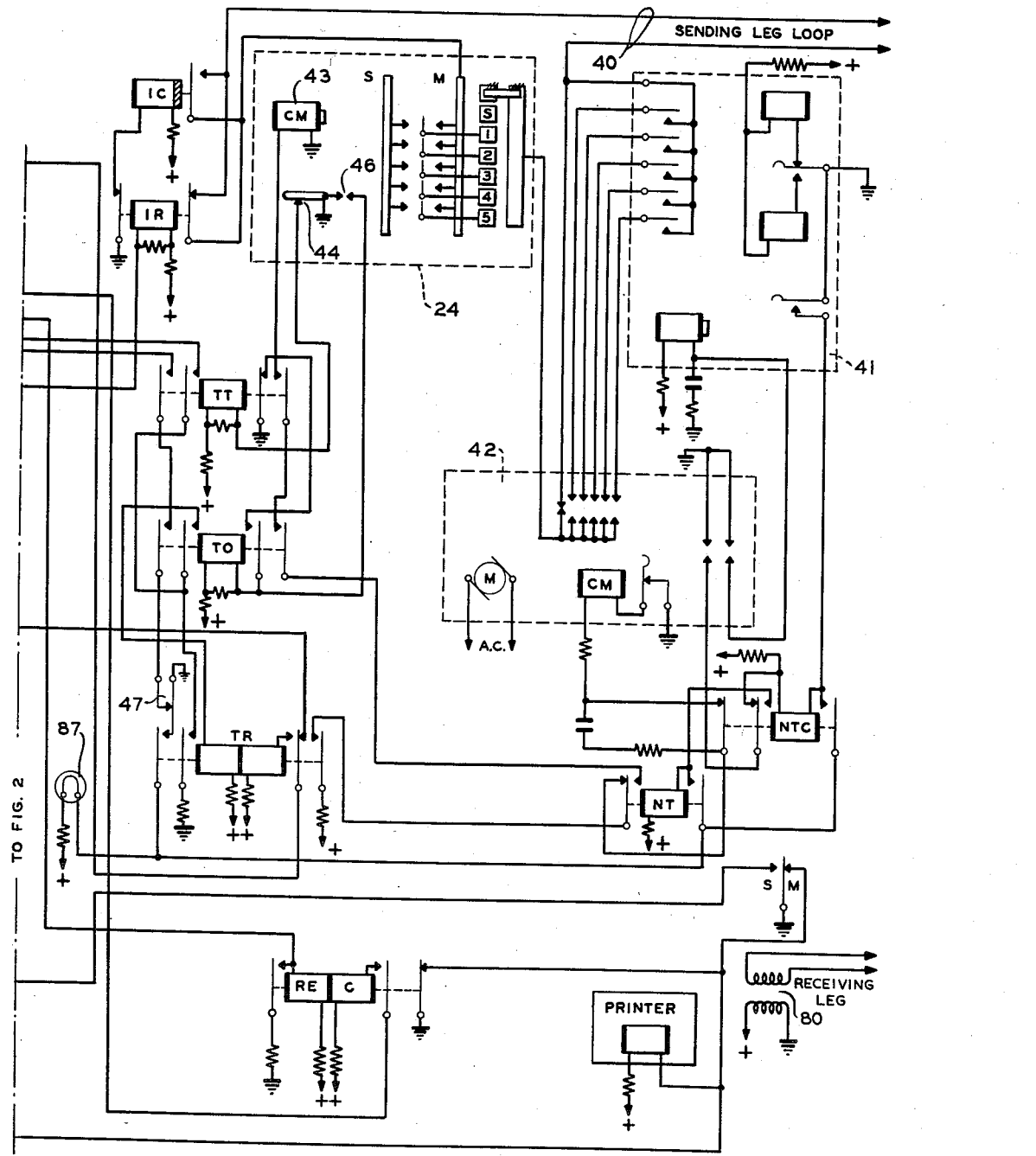
Figure 4:
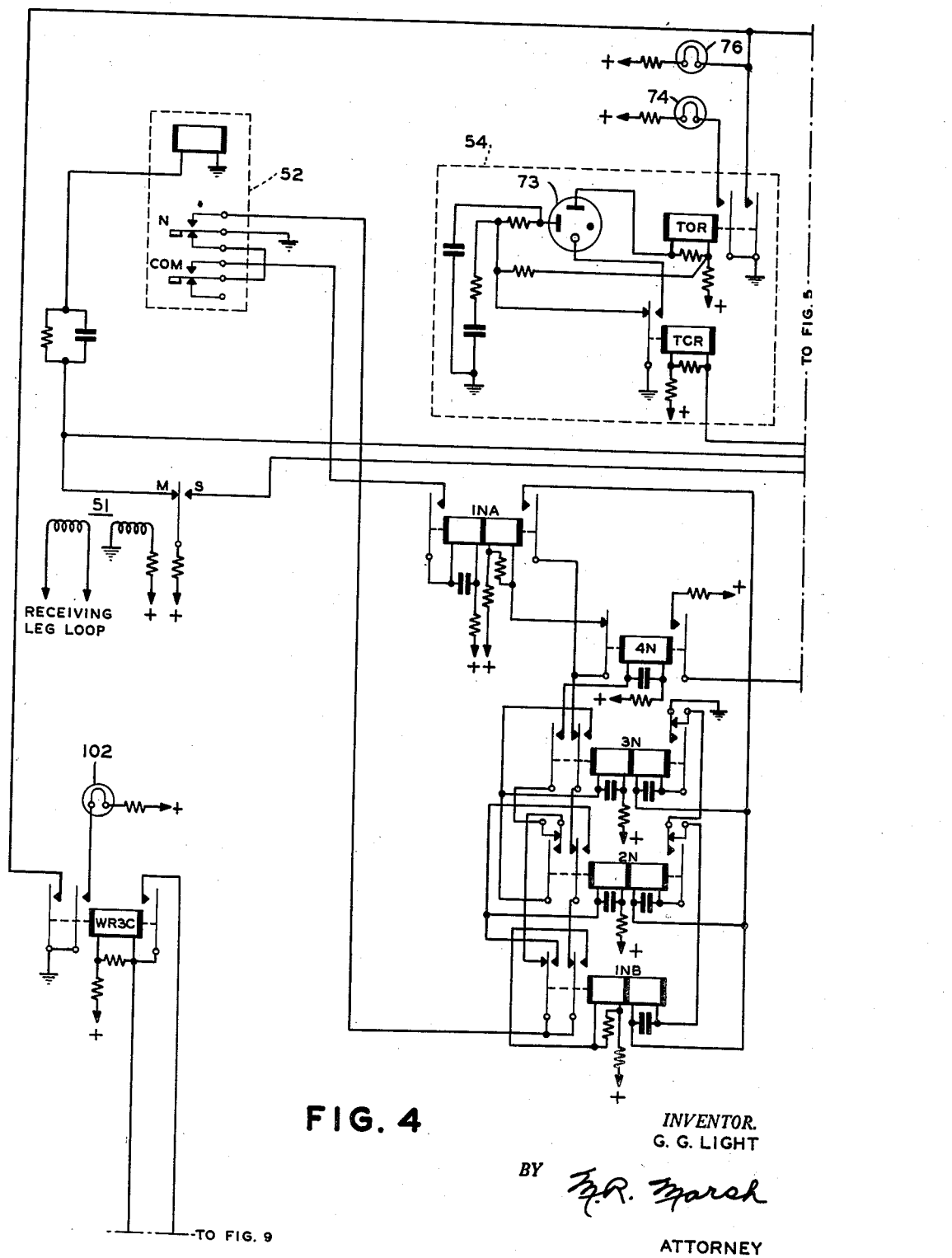
Figs. 4 to 15 are circuit drawings of the interconnections between items of equipment at the central office.
Figure 5:
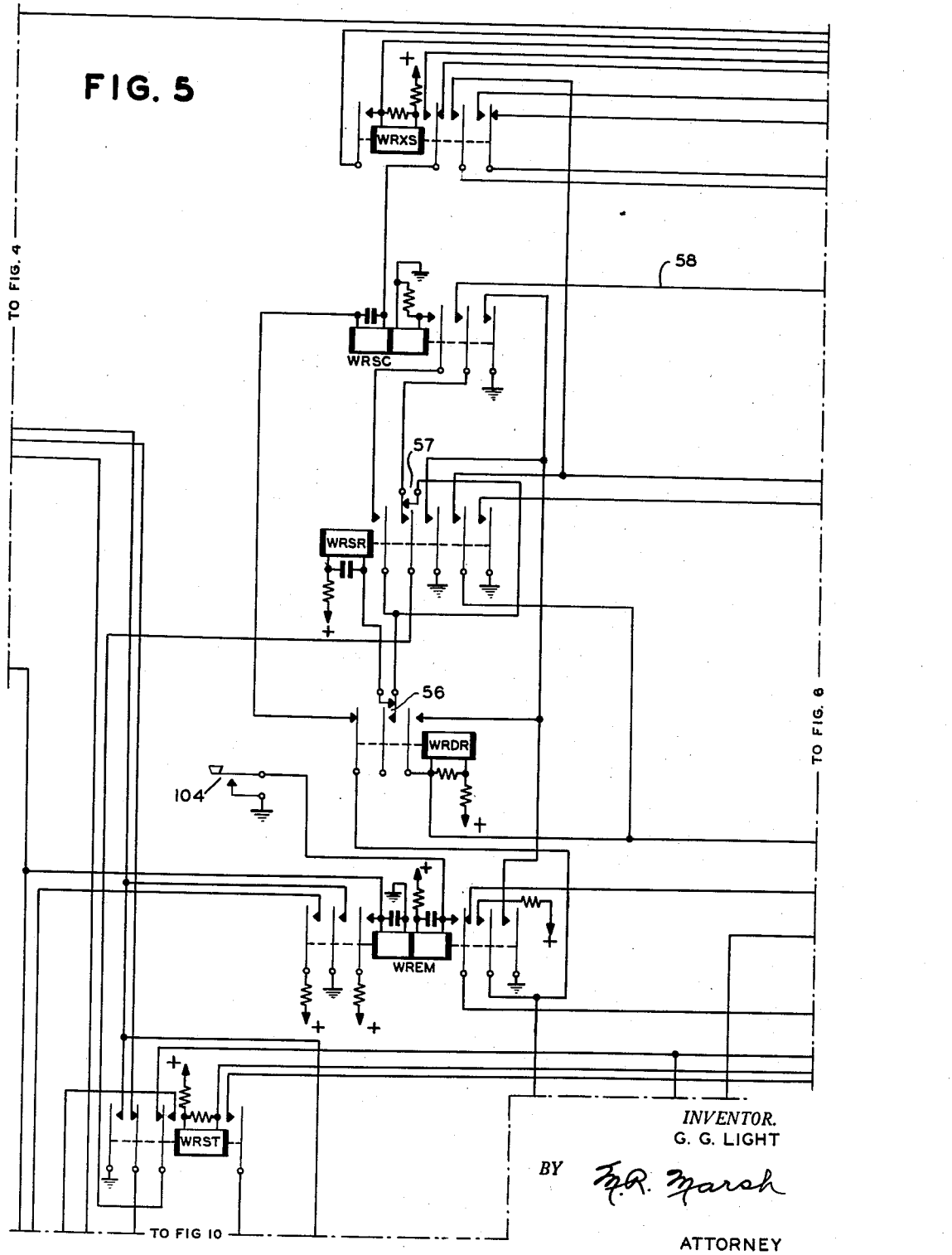
Figure 6:
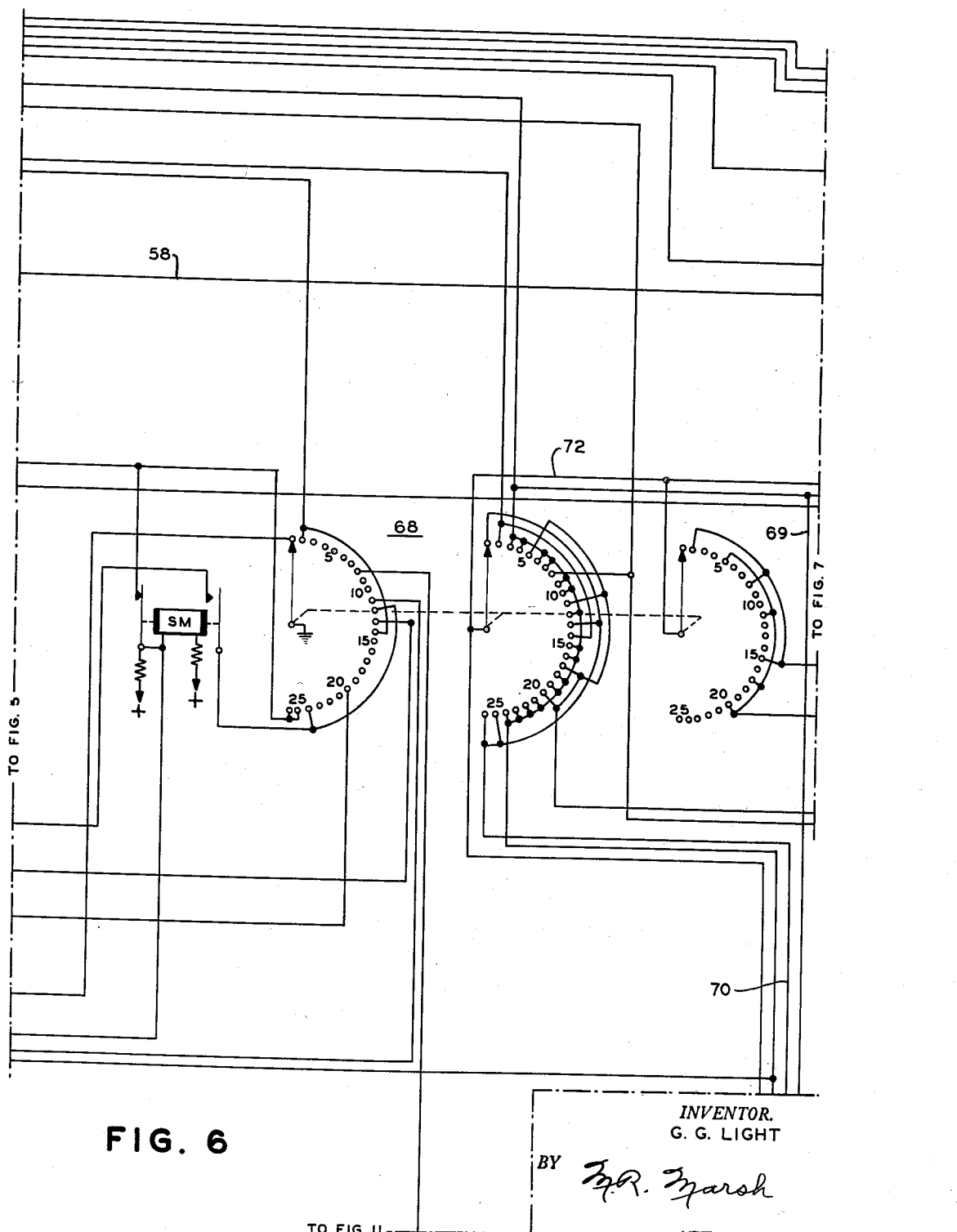
Figure 7:
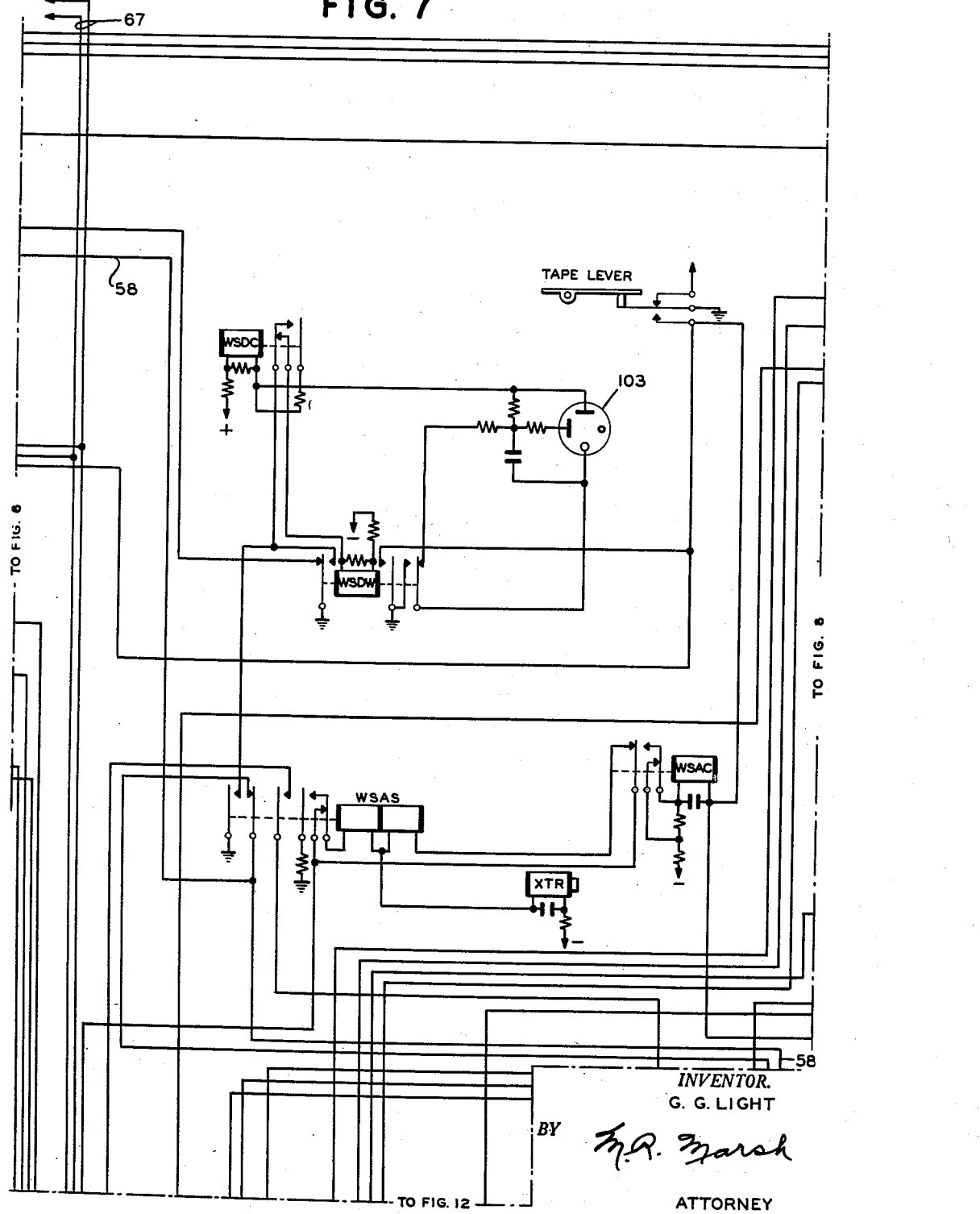
Figure 8:
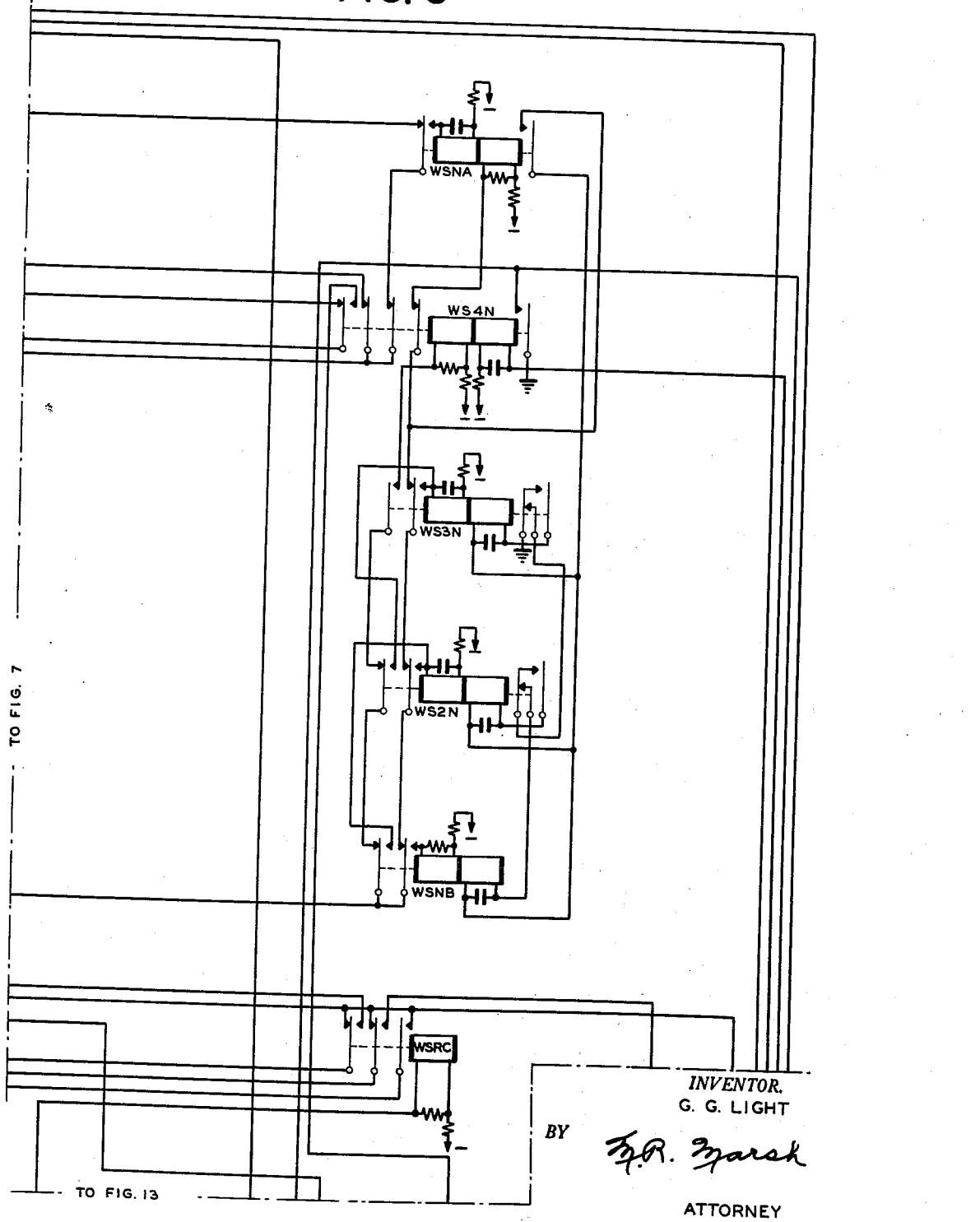
Figure 9:
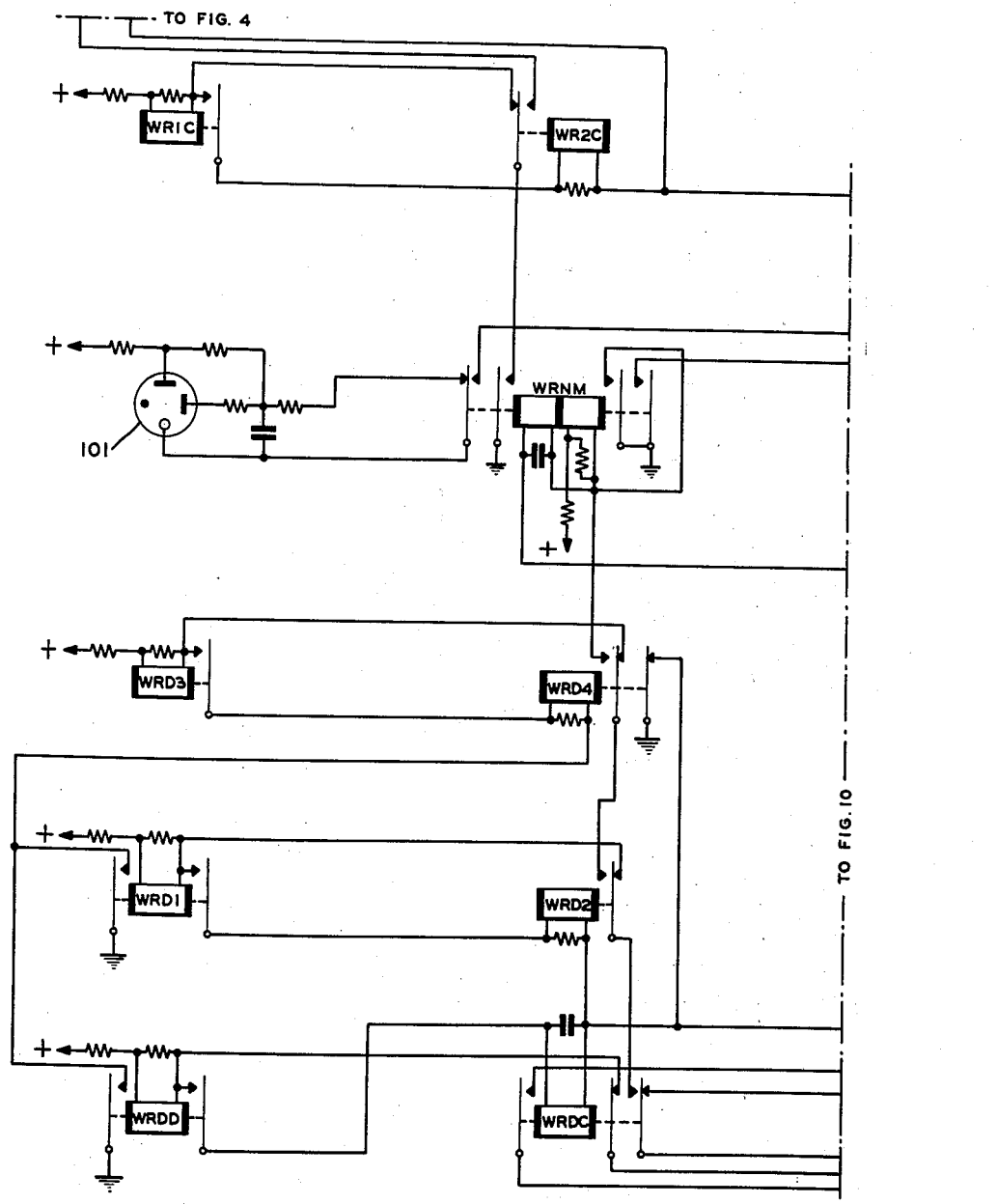
Figure 10:
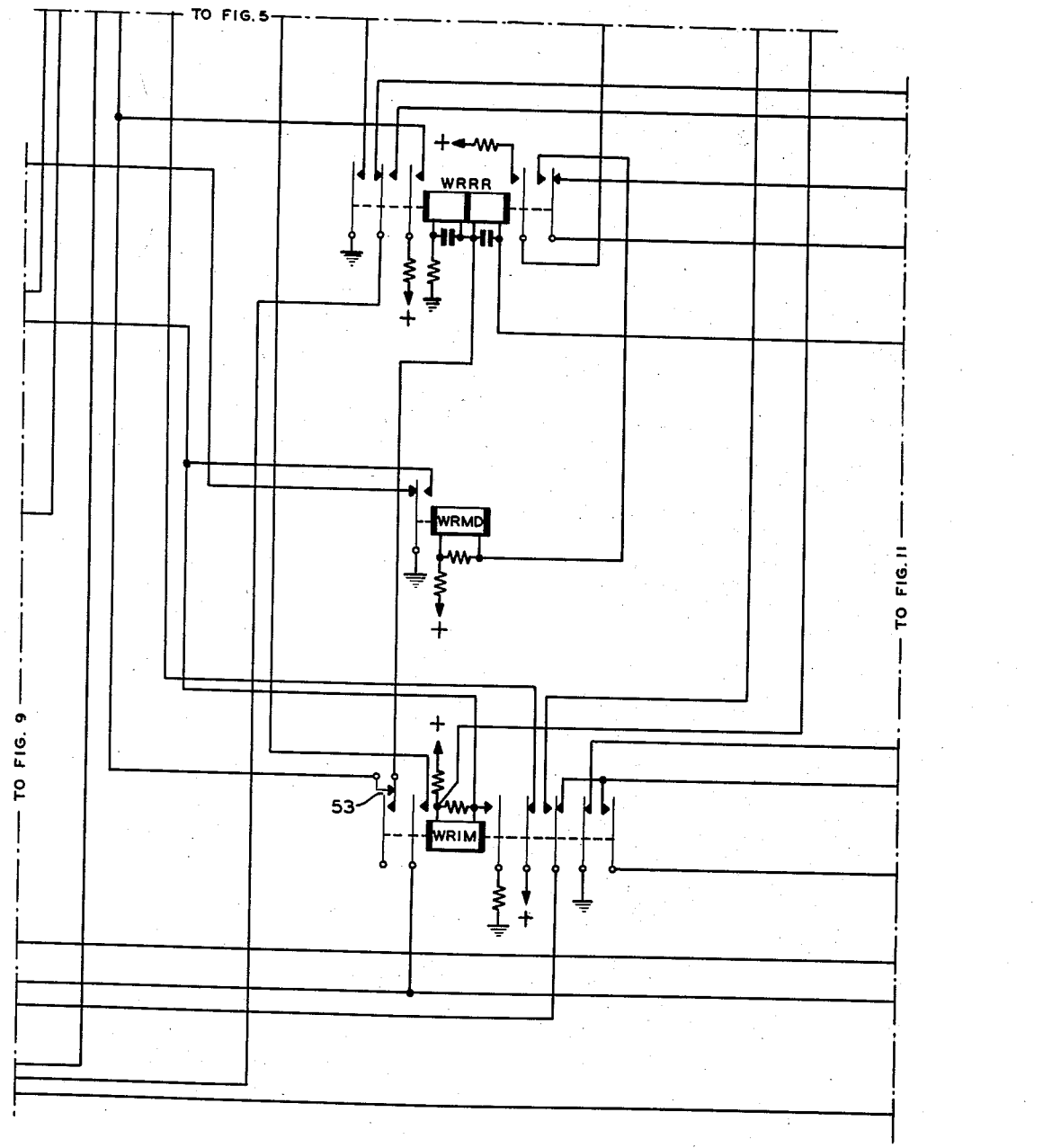
Figure 11:
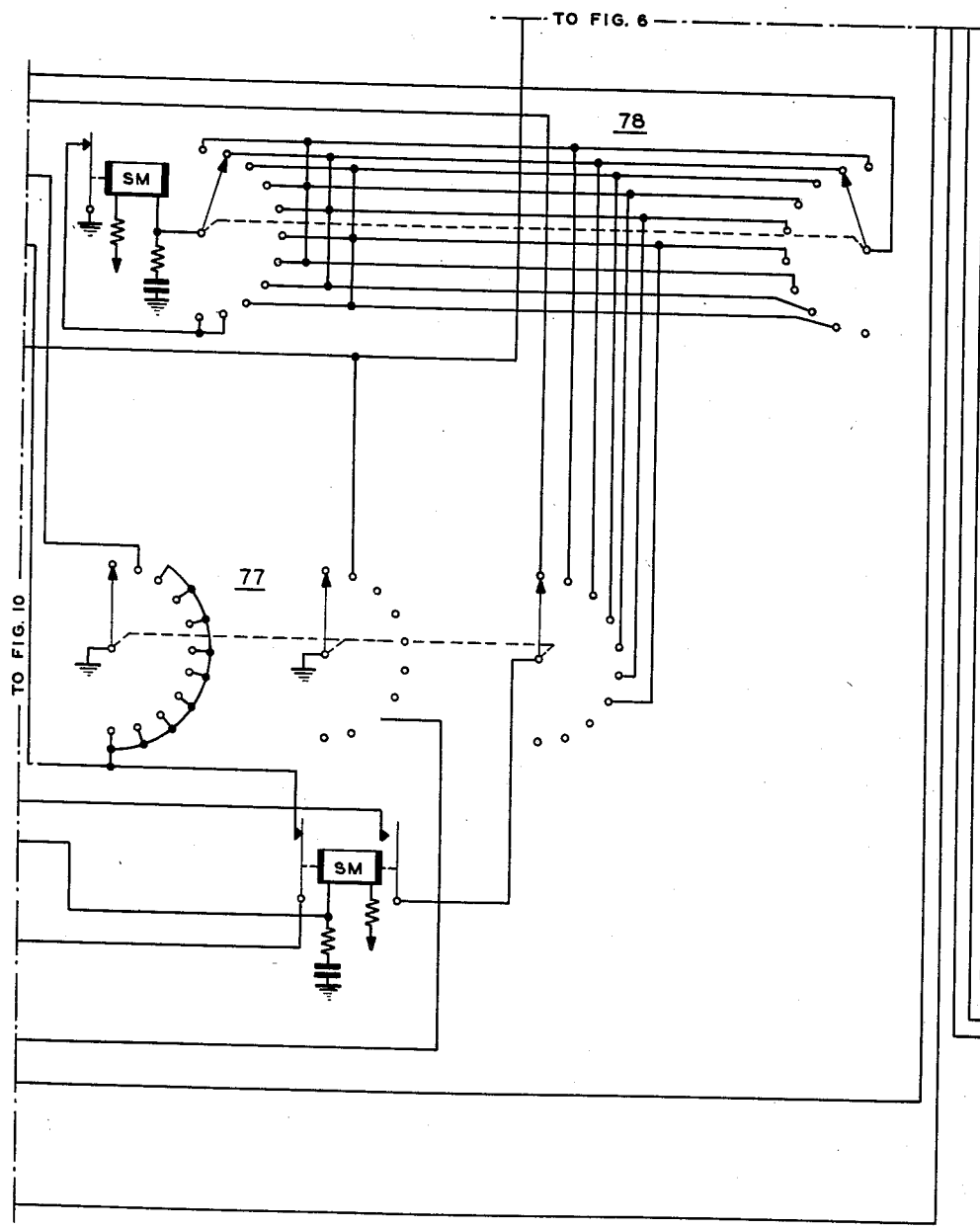
Figure 12:
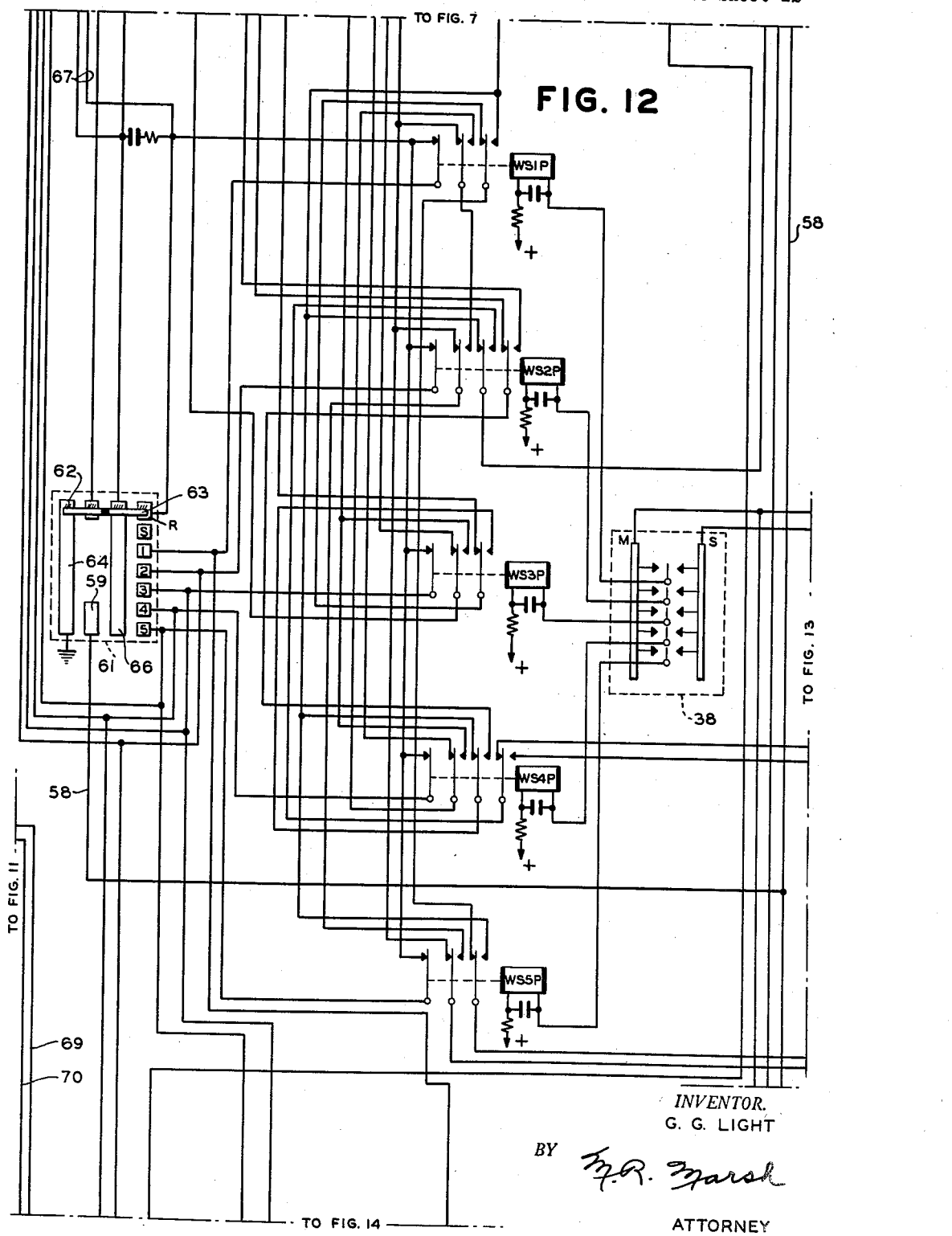
Figure 13:
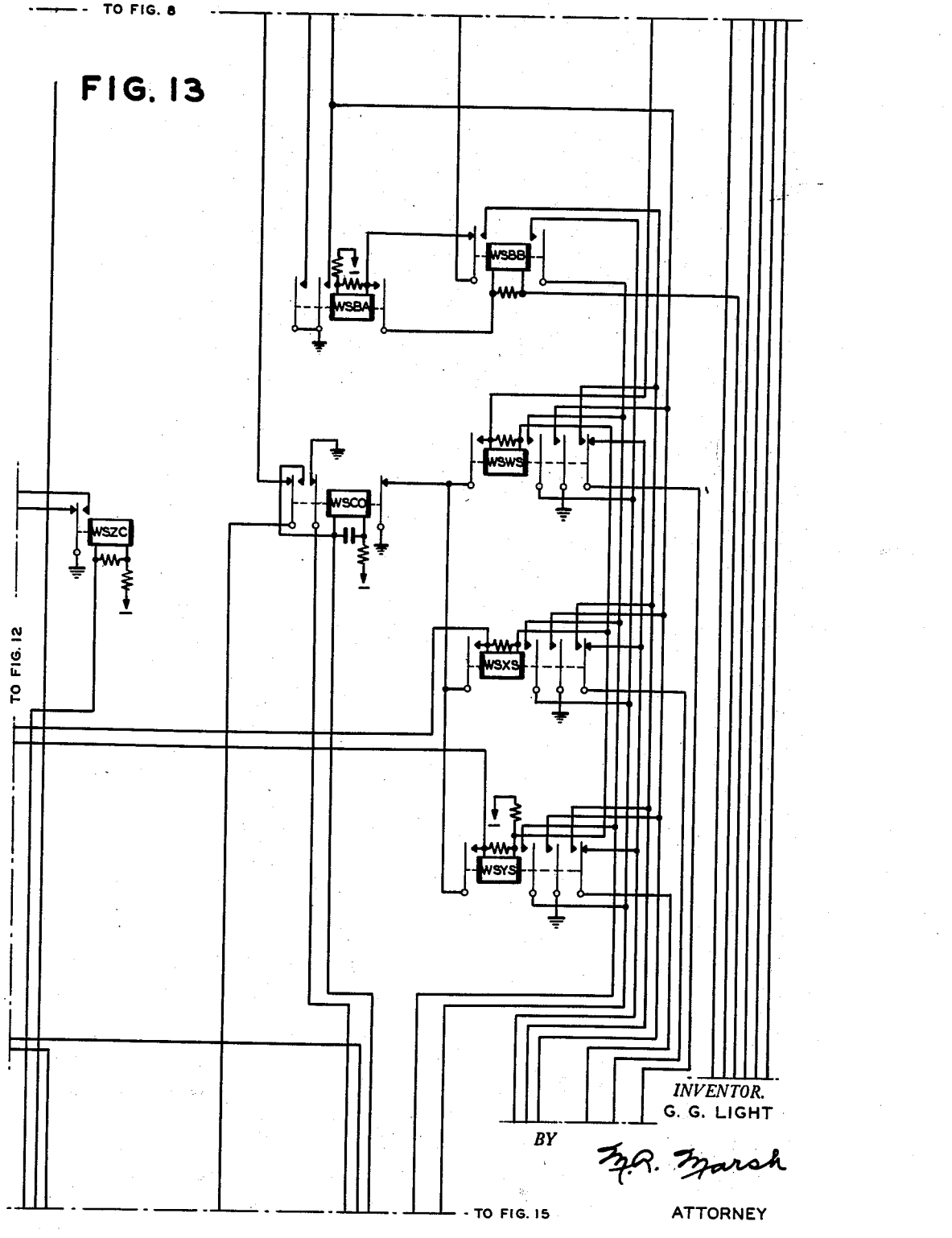
Figure 14:
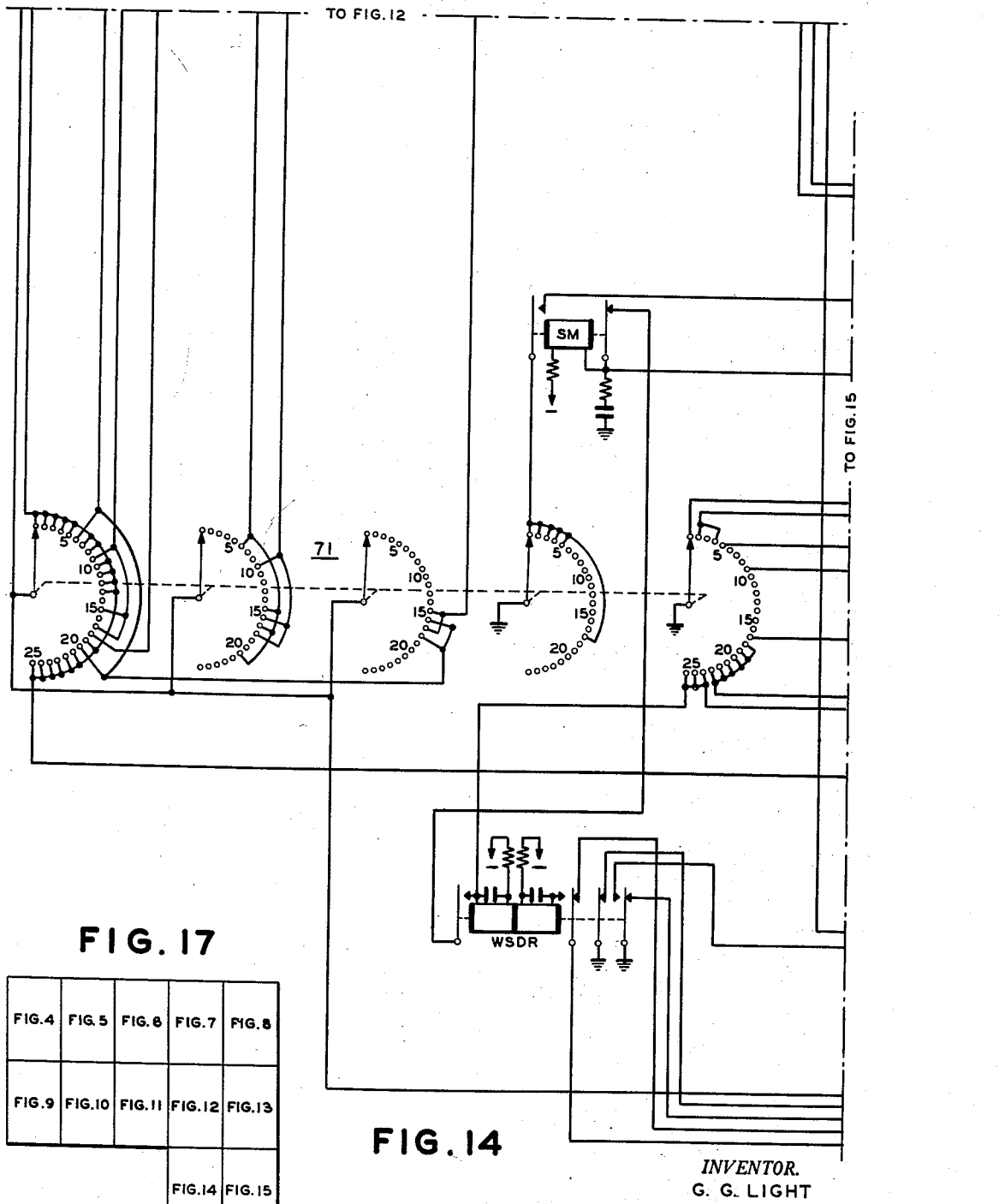
Figure 15:
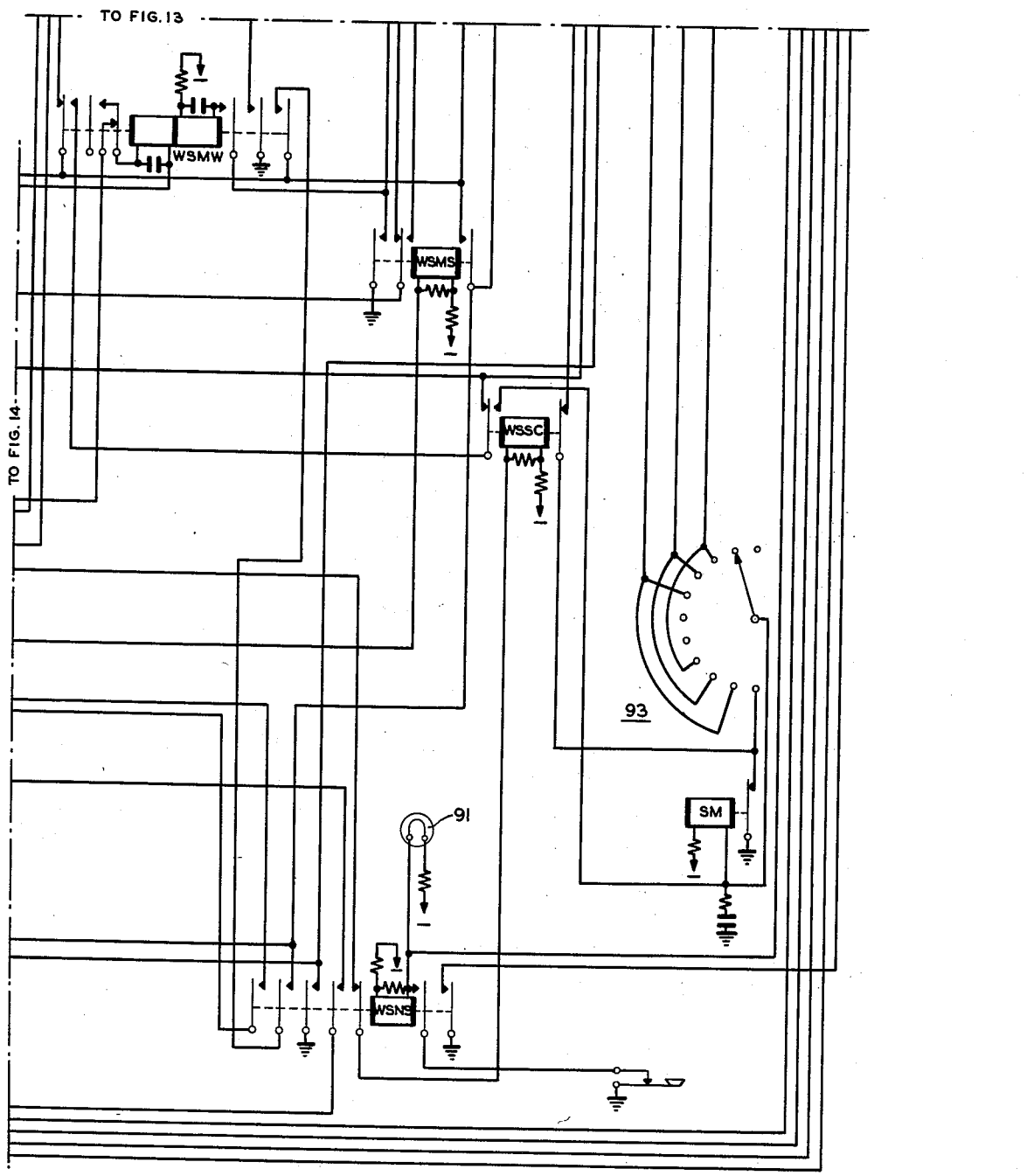

Referring now to Figs. 2 and 3, the numbering machine is indicated by reference numeral 41 and has an associated distributor 42 for distributing the codes set up by the numbering machine to the sending leg loop 40 of the way circuit. The transmitter distributor 24 has a normally deenergized clutch magnet 43, a tape lever contact 44 and a tape-out contact 46. As the operator places the tape containing the message to be transmitted in the transmitter unit of the transmitter distributor 24, the tape-out contacts 46 are closed and the tape lever of the tape lever contacts is operated to close the said contacts. The operation of these two sets of contacts completes circuits for the operation of relays TO and TT.

In the preferred embodiment of the invention means are provided whereby a message at a way station having a high priority is transmitted to the central office ahead of any message having a low priority at any of the other way stations. To indicate the priority of messages at a way station, a high priority push button HP and a low priority push button LP together with associated signal lamps are provided. If it is assumed that the message in the tape to be transmitted from the transmitter distributor 24 is a high priority message, the operator after placing the tape in the transmitter operates the high priority push button HP. The operation of this push button completes a circuit from potential through the coil of its associated HP relay, the lower contact and tongue of the HP push button and front contacts of operated relays TT and TO and contacts 47 of relay TR to ground. This circuit operates relay HP which completes a circuit from ground at make contacts thereof through back contacts of relay IL and the coil of relay IR to potential, causing the latter relay to operate. Operation of relay IR opens the normally closed sending leg loop 40 to initiate transmission of an open line condition to the central office. Operation of relay IR also interrupts the circuit to the normally operated slow-release relay IC which subsequently releases to close the sending leg loop and thus terminate the open line condition. In the system herein described the open line condition is approximately 40 milliseconds long. In a similar manner the operation of the low priority push button at a way station causes the transmission of a similar 40 milliseconds open to the sending leg loop by the operation of its associated relay LP.

The transmission of the 40 milliseconds open from the way station is dependent upon the circuit to the switching center being idle and this is indicated at the way station by relay IL being released. If the sending leg 40 had been busy at the time the HP or LP push button was operated, the 40 millisecond open would be transmitted when it became idle. Thus a call for the use of the way circuit by a station can be registered while the circuit is busy.

The 40 milliseconds open is called an invitation request and its receipt at the central office initiates cycling equipment into operation which causes the transmission to the way circuit of a so-called invitation sequence. In a manner hereinafter pointed out in detail, the invitation sequence first transmits to the way station signals to determine or in effect ask the way circuit whether one or more of the way stations have a high priority message to transmit. If a way station has a high priority message, any station having a low priority message will at this time be locked out and prevented from using the circuit until all the high priority messages at other way stations are transmitted. It should be kept in mind that all transmission, including control signals and message signals, from the central office to the way circuit is over the sending leg loop from the central office, and all requests and message signals from the way circuit are received over the receiving leg loop at the central office.

Referring now to Figs. 4 to 15, the receiving leg loop at the central office terminates in a polar relay 51 the tongue of which has potential applied thereto and the marking contact M is connected through the selector magnet of a printer perforator 52 to ground. The spacing contact S of relay 51 extends through a contact 53 of relay WRIM and the left-hand coil of relay WRRR to ground. Accordingly, the 40 milliseconds invitation request open operates the relay 51 to the spacing contact and completes a circuit for the operation of relay WRRR which operates and locks up. Among other functions performed by the operation of relay WRRR is the completion of a circuit from potential through back contacts of relay WRDR, the left-hand coil of relay WRSC, back contacts of relays WRXS and WSDW to ground, causing relay WRSC to operate. Relay WRRR also completes a circuit for the operation of relay TCR of an electronic timer 54 to initiate a timing operation.

The operation of relay WRSC prepares a circuit for the operation of relay WRSR. This circuit is from potential through the coil of relay WRSR, contacts 56 of relay WRDR, contacts 57 of relay WRSR, front contacts of relay WRSC, and conductor 58 to the read segment 59 of the distributor 61. The distributor 61 has constantly rotating brushes 62 and 63 traversing associated segments and rings, brush 62 being called a local brush and brush 63 the transmitting brush. The local ring 64 is grounded and the transmitting ring 66 is connected to one side of the sending leg loop 67. Associated with the transmitting ring 66 is a rest segment R, a start segment S and 5 code pulse segments 1 to 5. The code pulse segments 1 to 5 are individually connected to the left-hand tongues of associated pulse relays WS1P to WS5P. In the idle condition or when the sending leg at the central office is not transmitting, the pulse relays WS1P to WS5P are all operated and hence there are no message codes set up by the tongues of these relays on the segments associated with the transmitting ring 66. However, as will be described, other function codes are set up on the transmitting segments 1 to 5 by means including rotary switches. One such rotary switch 68 called the inviting sequence rotary switch controls the transmission to the line of signals to invite the various way stations to transmit to the central office.

With relay WRSC operated ground is applied to the above described read circuit and the coil of relay WRSR when the brush 62 reaches the read segment 59 to operate relay WRSR. Relay WRSR and relay WRSC when operated lock up in series. Depending upon the time of operation of relay WRSC with respect to the position of the brush 62, the first read pulse may be of sufficient length to only operate relay WRSR which in operating, transfers through contacts 57 the read pulse through a back contact of relay WRST to the coil of the step magnet SM of the 3-level rotary switch 68. If the first read pulse does not operate the step magnet because of insufficient length, the next pulse does so and steps the rotary switch 68 from the first to the second point.

The sending leg loop 67, which is connected to the transmitting ring 66 and various segments of the associated segment ring, is shorted with the rotary switch 68 on its No. 1 point or home position by a circuit including conductor 69 the No. 1 point and wiper of the left-hand level of rotary switch 71, conductor 70, the No. 1 point and wiper of the middle lever of rotary switch 68 and conductor 72 to the other side of the sending leg loop 67. Thus with the rotary switch 68 in its home position a continuous marking signal is transmitted to the loop 67. When the wipers of rotary switch 68 are advanced to the No. 2 points, the above short is removed from the sending loop and one branch thereof is connected through the middle and right-hand wipers of rotary switch 68 to the Nos. 4 and 5 transmitting segments of the distributor, the circuit to the No. 4 segment extending through a back contact of relay WRXS so that on the subsequent revolution of the brush 63 the letter "O" is transmitted to the line. The letter "O" consists, in addition to the start and rest pulses, pulses of spacing, spacing, spacing, marking and marking. The letter "O" is called an activate character and its function at the way stations will be described in the following paragraphs.

Following the transmission of the letter "O," the rotary switch 68 is stepped to its third point and during the next revolution of the brush 62 the rotary switch is stepped to its fourth point. The sending leg loop 67 is closed during the time the rotary switch 68 is on its third and fourth points and this constitutes what is termed hereinafter as two dwell periods, a dwell being the length of time required for the distributor 61 to make one complete revolution.

The rotary switch 68 is next stepped to its No. 5 point and in this position the letter "I" is set up on the segments 1 to 5 to cause such a letter to be sent to the sending leg loop on the next revolution of the brush 63. The letter "I" has the No. 1, 4 and 5 pulses spacing and pulses 2 and 3 marking.

In connection with the transmission of the letter I to the sending leg 67 the rotary switch 68 steps to its 6th position where the sending leg is shorted and another dwell occurs. Rotary switch 68 then steps to its 7th position and a second dwell occurs following which the rotary switch steps to its 8th position and the letter O is transmitted. With the rotary switch in its 8th position the wiper of the left-hand level applies ground to the right-hand coil of relay WRRR and the circuit thereof is in opposition to that through the left-hand coil which causes the said relay to release. It in turn releases relay TCR of the timer and stops the timing function thereof. When TCR operated it removed ground from one side of a timing condenser to permit the same to begin to charge. Had the ground been removed for at least a predetermined length of time, approximately 10 seconds, the condenser would charge sufficiently to cause the tube 73 to fire and complete an operating circuit for relay TOR. Relay TOR in operating among other things completes a circuit for the operation of an equipment tieup lamp 74 as well as a supervisory lamp 76. Since the above 8 steps of the rotary switch 68 occurred in less time than required for the timer 54 to operate, neither lamps 74 nor 76 would be illuminated, and the release of relay WRRR returns the timer to its normal condition.

The rotary switch 68 next steps through its 9th and 10th positions and maintains the sending leg closed so that two more dwells occur and in the case of a high priority message waiting for transmission at a way station, there is transmitted from the calling way station to the central office during these dwells another 40 milliseconds open. The manner in which this 40 milliseconds open is transmitted will be described hereinafter and on low priority messages there is no such second 40 milliseconds open transmitted but only the first or initiating request.

Since it is assumed that the out station has a high priority message, the transmission of the second 40 milliseconds open causes the reoperation of relay WRRR which in turn resets the timer 54 to start retiming. Subsequently thereto rotary switch 68 steps to its 11th position and causes an I character to be transmitted to the line. In this position of the rotary switch the wiper of the left-hand level completes a circuit for the operation of relay WRST which operates and interrupts a circuit supplying holding battery to the central office printer perforator 52. Relay WRST in operating transfers the circuit from the read segment 59 of the distributor 61 formerly extending to the step magnet SM of rotary switch 68 through back contacts of relays WRDC and WRIM to the step magnet SM of a 3-level rotary switch 77. Energization of the step magnet of rotary switch 77 on the next read pulse completes a circuit from ground through back contacts of relay WRIM, the right-hand contacts of the step magnet of rotary switch 77, the wiper of the right-hand level thereof and No. 1 point, make contacts of relay WRRR, back contacts of relay WRDC, and the coil of relay WRDD to potential, causing the latter relay to operate. The operation of relay WRDD is dependent upon relay WRRR being operated in response to the second 40 milliseconds open transmitted from the calling way station having the high priority message to transmit. At the end of the read pulse the step magnet of rotary switch 77 releases and the shorting ground around the coil of relay WRDC is removed, whereupon said relay operates by a circuit including back contacts of relay WRD4. The next read pulse is applied through front contacts of relay WRDC and back contacts of relay WRD2 through the coil of relay WRD1 to potential, causing the latter to operate, and at the end of this read pulse relay WRD2 is operated. The operation of relay WRD2 transfers the read pulse circuit through front contacts thereof and back contacts of relay WRD4 through the coil of relay WRD3 to potential so that the latter relay operates on the next read pulse. At the end of this read pulse relay WRD4 operates. The operation of relay WRD4 removes the holding ground from relay WRDC which thereupon releases and transfers the read pulse back to the step magnet SM of rotary switch 77. As rotary switch 77 steps to its second point, its middle wiper completes a circuit through the right-hand coil of relay WRRR causing it to again release.

During the time relay WRDC is operated, the sending leg loop 67 is shorted and dwell periods are transmitted from the central office to the way circuit.

Following the stepping of rotary switch 77 to point 2, the second release of relay WRRR puts it in readiness to detect the first signal of a message incoming to the central office. At this time the letter I is transmitted to the way circuit and the position of the wipers of a rotary switch 78 called a memory switch is examined to determine what station should be invited first. The memory switch 78 functions to sequentially invite the various way stations to transmit in turn. If station W is to be invited to transmit, two dwells are introduced after the last letter I, and if not another I is transmitted immediately. The manner in which the two dwells following this letter I control the circuits at the way stations to permit various stations to transmit will be pointed out hereinafter.

As the read pulse is completed to energize the step magnet SM of rotary switch 77 while it is on point 2, a ground through the right-hand contacts of the step magnet is extended through the right-hand wiper of switch 77 and its No. 2 point to the Nos. 1, 4 and 7 points of the two levels of the memory switch 78. With the memory switch resting on point 2, it indicates that the last message incoming from the way circuit was from station W and that station X should be the first station invited in the present inviting sequence. Inasmuch as there is no circuit established to point 1 of the memory switch, no dwell interval takes place following the transmission of the character I currently being transmitted. At the termination of the read pulse under discussion the rotary count switch 77 steps to point 3 and on the next read pulse and during the transmission of the letter I, the ground through the right-hand contacts of the step magnet of rotary switch 77 is extended to points 2, 5 and 8 of the levels of switch 78. With the memory switch 78 assumed to be resting on point 2, the above ground operates its step magnet and also extends through back contacts of relay WRRR and the coil of relay WRDD to operate the latter. At the end of the read pulse rotary switch 77 advances to point 4 and rotary switch 78 advances to point 3 and relay WRDC operates. The operation of relay WRDC again shorts the sending leg loop 67 and transfers the read pulse to the counting relay circuit including relays WRD1, WRD2, WRD3 and WRD4 so that two dwell periods are introduced following the last letter I.

As hereinafter pointed out, the invited way station now begins to transmit and at the switching center the start pulse of the first character transmitted from the way station operates relay WRRR in the manner pointed out above. This operation of relay WRRR extends ground from the left-hand wiper of switch 77 through front contacts of relay WRRR and the coil of relay WRMD to operate the same. Relay WRMD in operating completes a circuit for the operation of the incoming message relay WRIM which operates and establishes a locking circuit for itself. Relay WRIM in operating also completes a circuit to cause rotary switch 77 to self-step to its home or No. 1 position, transfers the read pulse circuit back to the step magnet of rotary switch 68 and shorts the sending leg loop 67 so that no additional I characters will be transmitted.

At this time rotary switch 68 is resting on point 11 and following the occurrence of two dwell periods, the count relays WRD1 and WRD4 release as pointed out and on the next closure of the read pulse circuit, switch 68 is stepped from point 11 to point 12. This interval provides a third dwell and a fourth dwell is introduced while the switch is in point 12. The application of the next read pulse to the step magnet of the rotary switch 68 closes the contacts to the right of the magnet to extend a ground from the left-hand wiper of rotary switch 68, through point 12 and the coil of relay WRDR to potential to operate the same. At the end of this read pulse, rotary switch 68 steps to point 13 where it remains until the end of the message signal of the incoming message is read.

The operation of relay WRDR opens the locking circuit to relays WRSR and WRSC which release and relay WRSR in releasing removes the autostop condition from the transmitter at the central office so that any message therein which was held up during the transmission of the invitation sequence to the outgoing line from the central office can be resumed. Since it was assumed that the central office transmitter was idle at the start of the invitation sequence, the removal of the autostop from the central office transmitter has no effect at this time.

It will be noted that there were four dwell periods introduced and sent to the sending leg loop at the end of the invitation sequence and the purpose of these dwells is to assure sufficient time for the operation of certain relays at the way stations as will be described hereinafter.

The incoming message at this time will be recorded on the printer perforator 52 at the central office and the end of message is indicated by four N's. Each N operates the N contacts of the printer perforator and are counted on relays 1NB, 2N, 3N and 4N and if no intervening character is received in the 4N sequence, relay 4N operates momentarily to complete a circuit through the left-hand coil of relay WREM to ground and operates the same. Relay WREM is the end-of-message relay and its operation initiates a sequence to clear the way circuit so that any additional requests that may be stored at the way stations will be transmitted to the central office to start another invitation sequence. As relay WREM operates, a circuit is completed through the coil of WRSC to a tongue of relay WRXS and if the outgoing leg from the central office is idle, relay WRXS will be released and for this condition an activating character must be sent to the sending leg at the start of the sequence. If WRXS is operated at this time, an activated character is not transmitted since the condition of certain relays at the way stations are such that the activating character is unnecessary.

Up to this time switch 68 has been resting on point 13 and as relays WRSC and WRSR operate switch 68 steps to point 14. With relay WRXS operated switch 68 self-steps over point 14 to point 15 whereas if relay WRXS is not operated, the activating character O is transmitted to the sending leg loop 67 and the switch then steps to point 15. While switch 68 is on point 15, a dwell period is transmitted to the outgoing line and at the end thereof the switch is stepped to point 16 where another dwell period is transmitted. At the end of the second dwell period the switch is stepped to point 17 and while there the character I is transmitted to the sending loop. This is followed by two more dwell periods while the switch is on points 18 and 19 and the switch 68 then steps to point 20 and the character I is again transmitted followed by dwell periods as the switch steps through points 21, 22, 23 and 24. While on point 21 the wiper of the left-hand level of switch 68, a ground is applied to the battery side of relay WIRM causing it to release which among other things puts relay WRRR back in the circuit in readiness to respond to another initiating request signal from a way station. As the read pulse closes to operate the step magnet with switch 68 on point 24, a ground from the wiper of the left-hand level of switch 68 through make contacts of the step magnet is applied to the disconnect relay WRDR to operate the same. The switch 68 then steps to point 25 and then self-steps to its home position at point 1 where relay WREM is released. Relay WREM when released opens a locking circuit for relay WRDR which releases and it in turn causes the release of relays WRSR and WRSC. The equipment at the switching center has now been restored to its idle circuit condition and is in readiness to respond to and act upon any initiating request signal that may be received from any of the way stations in the manner pointed out above.

Returning now to the circuits of a way station such as those of Figs. 2 and 3, it will be recalled that in connection with the transmission of a message from the way station, the circuits have been described up to the point of transmitting a 40 millisecond invitation request open as the result of the operation of the high priority push button HP and the closure of the tape-out contacts 46 and the tape lever contacts 44 by the insertion of a tape in the transmitter 24. The 40 millisecond invitation request open initiates in operation equipment at the central office as described to transmit to the way circuit the invitation sequence which consisted of the letter O, two dwells, the letter I, two dwells, the letter O, two dwells, and the letter I. Since it was assumed that it was a high priority message waiting to be transmitted, two more dwells followed by the letter I were next transmitted to the way circuit with the I being followed by 6 dwells.

As the letter O is received at the way station, the receiving relay 80 is operated to spacing and a circuit is completed from the tongue thereof through a back contact of relay SEL and the right hand coil of relay ST to potential. Each of the other way stations on the way circuit have similar SEL and ST relays as well as associated equipment and at all the way stations the ST relays will be operated at this time.

As relay ST such as the one of Figs. 2 and 3 assumed to be at station W operates, it locks up and completes a circuit for the operation of relay SEL. Relay ST also removes ground from the timing condenser 81 associated with vacuum tube 82 so the said condenser commences to charge. Since the spacing pulses of the character O which caused operation of relay ST are followed by two dwell periods wherein the receiving relay 80 remains on its marking contact, sufficient time elapses for condenser 81 to charge and cause tube 82 to fire. When tube 82 fires it completes a circuit through the left hand coil of relay ST to release the same, and some time thereafter the character I is received at the way station. With relay ST released and relay SEL operated, the start and first code pulse of the character I being spacing, extends the ground on the tongue of relay 80 through a front contact of relay SEL and a back contact of relay ST, through the coil of relay SS to potential. The operation of relay SS restores ground to the battery side of condenser 83 associated with tube 84 to discharge the condenser which had started to charge when relay ST released with relay SEL operated.

In addition relay SS in operating completes a circuit through the coil of slow-to-release relay HR and the coil of step magnet SM of rotary switch 86 causing the same to operate. Relay HR in operating completes a circuit for the operation of slow-to-release relay CR. Now as the receiving relay 80 goes marking in response to the No. 2 marking pulse of the character I, relay SS releases immediately but relay HR remains operated after the circuit is opened thereto for approximately the time equivalent to one dwell. As the step magnet SM of rotary switch 86 releases, the wipers thereof are advanced from their home position H to the No. 1 point and as the fourth and fifth spacing impulses of the character I are received, relay SS is again operated to again complete the circuit for the step magnet SM of rotary switch 86. During the rest pulse of this character relay SS releases to release the step magnet and advance the wipers of rotary switch 86 to point 2.

There is next received over the way circuit two dwell periods which are transmitted as described while the rotary switch 68 at the central office is on points 6 and 7. At the end of approximately the first dwell, relay HR releases and since relay CR will remain operated for some time after the release of relay HR, ground from the tongue of relay HR is applied through the front contact of relay CR to the wiper of the upper level of rotary switch 86, its associated point 2, a back contact of relay TR and the left hand coil of relay IL to potential. This circuit operates relay IL which locks up to ground at one of its own tongues. The operation of relay IL preferably occurs some time during the receipt of the second dwell following the I character and the second dwell is followed in turn by the character O. The start and first three code pulses of this character are spacing and cause operation of relay SS which in turn reoperates relay HR and the step magnet of rotary switch 86. Relay HR released during the previous dwell periods which also cause release of relay CR. The single operation and release of the step magnet SM during the character O advancing the wipers of rotary switch 86 to point 3 or only one step whereas the character I effects two steps of the rotary switch. The character O is followed by two dwell periods and as previously described during these dwells relay HR releases followed some time later by release of relay CR. Between the release of these two relays, ground on the upper wiper of switch 86 is extended through point 3, the front contacts of relays HP and IL through the coil of relay IR to potential. Relay IR is thereupon operated to open the sending leg loop from the way station and initiate the transmission of a 40 millisecond open-line condition as previously described in connection with the operation of relay IR in response to the actuation of the HP push button.

The termination of the second 40 millisecond open is effected by the subsequent operation of relay IC. It will be noted that had relay HP not been operated, the second energization of relay IR would not occur and hence the second 40 millisecond open line condition is transmitted from the way station only when waiting to transmit a high priority message.

The 40 millisecond open line condition occurs during the above-mentioned two dwell periods from the central office while the inviting sequence rotary switch 68 is on points 9 and 10. These are followed by a character I which as set forth advances the wipers of rotary switch 86 from point 3 through point 4 to point 5. At point 5 ground is applied from the wiper of the upper level through the coil of relay RL to potential causing the same to operate which locks up by circuit through a front contact of relay IL.

The next I character received at the way station advances the rotary switch 86 to point 7 and this is the point at which the particular station shown in Figs. 2 and 3, is invited to send to the central office. When the wiper reaches point 7, the following dwell periods causes relay HR to release and complete a circuit from ground through the upper wiper of the switch, the front contacts of relays HP, TT, TO and the left hand coil of relay TR, the transmitting relay, to potential, causing the latter relay to operate and lock up through front contacts of relay TO and its own front contacts. TR in operating lights the transmit lamp 87 and completes a circuit to the clutch magnet CM of the distributor 42 to initiate a cycle of operation of the automatic numbering machine 41. The distributor 42 at this time is connected across the sending leg loop and the numbering machine 41 sends its information to the loop and at the end of its cycle of operation, relay NTC operates, followed by the operation of relay NT to interrupt the distributor clutch magnet circuit and transfer this circuit to the clutch magnet 43 of distributor 24. As this clutch magnet is energized, the distributor 24 operates and causes the message in the tape of the transmitter to be transmitted to the line. At the central office the number from the numbering machine is recognized and no further signals are sent therefrom. Consequently the receiving relay 80 rests on its marking side and relay SS will not be further operated. Accordingly, the ground which relay SS was periodically applying to the timing condenser 43 will no longer be present and with relay SEL still operated, the condenser 83 is permitted to charge sufficiently to cause tube 84 to fire. As tube 84 fires, it completes a circuit through the right hand coil of relay SEL to release the same. This completes a circuit for the energization of relay RR which operates and through an obvious circuit including the interrupter contacts of the step magnet of rotary switch 86 causes the said rotary switch to self-step to its home position.

At the end of the message the tape-out contacts 46 open to release relay TO which opens the locking circuit to relay TR and causes it to release. At the central office the end-of-message signal causes an activator or O character to be sent to the way circuit and thus operates the circuits of the way stations in a manner similar to that described in connection with the receipt of the first O character. Two dwell periods then occur and are followed by an I character. The I character causes the wiper of the upper level of rotary switch 86 to advance to point 2 and the dwell period thereafter causes a ground to be applied to the wiper and extended through a front contact of relay TR if the said relay is operated and not released by the opening of the tape-out contact 46 to knock relay TR down and thus prevent a way station from seizing the way circuit for the transmission of more than one message at a time. The next I character steps the rotary switch 86 to point 4 and during the following two dwell periods a ground is applied to point 4 and extends through front contacts of relay IL and the right hand coil thereof to knock the said relay down and open the locking circuit to relay RL. A number of dwell periods then occur and during this time relay SEL releases in a manner described, which operates relay RR to step rotary switch 86 to its home position. Thus at the end of the message the circuits at the way station are returned to their normal condition in readiness to respond to another request to transmit to the central office.

It will be noted that relay TR in Figs. 2 and 3 operated when the rotary switch 86 rested on point 7 to cut in this particular way station. The circuit to relay TR at the other way stations are connected to other points on the rotary switch. Relay TR of station X may be connected to point 9 on its particular switch and the TR relay of station Y to point 11 of its particular switch, and hence a pair of dwells occurring with the switches in these respective positions will invite the respective stations to transmit. Since no two stations are connected to similar points on their rotary switch 86, only one station can be invited at a time.

The operation of the circuits particularly at the central office will now be set forth in connection with the transmission of a message therefrom to a way station such, for example, as way station W represented by Figs. 2 and 3 of the drawings. In connection with the above, it will be assumed that a message has been received on the reperforator 29, Fig. 1, in a receiving position 27 and is stored in the tape 33. The operator on inspection of the tape determines the destination thereof, which in the assumed case is station W, and operates the W push button 28. This operation controls a rotary switch 34 to connect a circuit from the associated transmitter 32 to another reperforator 36 and initiate the operation of one of the numbering machines 39. In this case it will be the numbering machine W which operates and causes characters ZCZC and an identification character preceding the message sequence number to be perforated in the tape 37. Some other characters from the numbering machine are then perforated in the tape and are then followed by the message.

The detailed circuits associated with the transmitter are shown in Figs. 4 to 15, and the transmitter is arranged in connection with constantly rotating distributor to idle blank characters through the transmitter until some characer other than a blank is stepped therein. Such a character will have one more pulse marking and completes a circuit through the coils of one or more of the pulse relays WS1P to WS5P and the transmitter marking bus bar M and the left hand coil of the message waiting relay WSMW. Relay WSMW is thus operated and locks up through its right hand coil and in operating completes a circuit from the read segment 59 of the distributor 61 through back contacts of relay WSSC and through the coil of the step magnet SM of the five level rotary switch 61 to potential. The rotary switch 71 is the sequence switch for outgoing messages and as the read pulse circuit is closed to energize the step magnet thereof a probe circuit is established through various tongues and contacts of the pulse relays WS1P to WS5P to check if the first character in the tape, or the ones over the pins of the transmitter, is a Z. The probe circuit extends from ground at the wiper of the second from the right hand level of switch 71, its No. 1 point, front contacts of its step magnet SM, back contacts of relay WSMS to the tongues and contacts of the pulse relays.

If the probe circuit checking the character Z in the transmitter finds this character, there will be no complete circuit through contacts of the pulse relays. However, if some character other than a Z is found in the transmitter, a circuit will be completed through the contacts of the pulse relays WS1P to WS5P and complete a circuit for the operation of relay WSNS and the lighting of the no-switch lamp 91 to call this condition to the attention of the attendant. Following the checking of the Z, the next read pulse advances rotary switch 71 to point 2 and in connection therewith the transmitter step magnet 92 is energized to advance the next character in the tape over the pins of the transmitter and it is checked to determine if it is a C. With the switch 71 on point 2, relay WSCZ is operated to transfer the marking and spacing bus bars of the transmitter 38 and if a C character is found over the pins, relay WSNS is not operated. After checking the C character, the transmitter is stepped and the rotary switch 71 is advanced to point 3 causing relay WSCZ to release and the probe circuit then checks for the third character or another Z. If this character checks as a Z, the fourth character in the tape is advanced over the pins of the transmitter and switch 71 steps to its No. 4 position where the second C is checked. If this character checks, switch 71 will be advance to point 5 and relay WSRC operated, which establishes circuits for reading whether the next character is a W, X or Y. If this character is any of the above, corresponding relays WSWS, WSXS or WSYS is operated and if not, relay WSNS is operated. It will be assumed that the following message in the tape in transmitter 38 is for station W and hence the character following ZCSC will be a W and relay WSWS will be operated. Had the message been for station X or Y as indicated by such characters, relays WSXS or WSYS would be operated at this time.

The operation of relay WSWS completes a circuit for the operation of relay WSAC which in turn in operating opens the normally closed circuit through the right hand coil of the autostop relay WSAS and autostop transmitter 92. During the time the switch 71 was stepping to point 5, the sending leg loop 67 was held closed and consequently relays ST and SEL at the way stations are released and the rotary switches 86 thereat are at their home positions. Subsequently the switch 71 is stepped to point 6 and in this position the transmitting segments of the distributor 61 are so connected that an activate character O is transmitted to the line. This character as described functions to operate the ST and SEL relays at all way stations and thereafter two dwell periods occur while switch 71 is on points 7 and 8. During this time all the ST relays at the way stations release.

The switch 71 next steps to point 9 and a character I is transmitted and a circuit from ground on the wiper of the right hand level of the switch 71 is completed through point 9, back contacts of relay WSNS, through the coil of relay WSSC to potential, operating the same. As relay WSSC operates, the read pulse circuit is transferred from the step magnet of switch 71 to a step magnet SM of a single level 11-point rotary switch 93. The various points of switch 93 are interconnected with contacts and tongues of relays WSWS, WSXS and WSYS in such a manner that 3, 4 or 5 I characters, respectively, are transmitted to the line depending upon which of the said relays is operated at this time and following these I characters switch 71 is stepped to point 10. As set forth, each I character received at the way stations causes their rotary switches 86 to be stepped twice and accordingly these switches will now be stepped to points 6, 8 or 10 depending on whether the message is for station W, X or Y. Since it was assumed that the message was for station W, three I's will be transmitted and the way station rotary switches 86 will all be on point 6.

Following the transmission of the third character I the read pulse circuit is transferred back to switch 71, which keeps the line closed while it is on points 10, 11, 12 and 13, thereby providing four dwell periods. At the way stations relays HR release to apply a ground to the upper wiper of the rotary switches, and at the selected station this ground operates its REC relay which locks up and removes the holding ground from the associated receiving printer. The following three dwell periods permit the SEL relays at all stations to release and reset their rotary switches and at the selected station the receiving printer will now respond to received line signals.

At the switching center the read pulses continue to step the sequence switch 71 and while it is on points 14, 15, 16 and 17 the characters ZCZC are transmitted to the sending loop. These characters will be recorded on the receiving printer at the selected way station and while the switch is on point 17, the right hand wiper completes a circuit for the operation of relay WSMS. This relay in operating prepares a circuit for the operation of relay WSCO when the following read pulse energizes the step magnet SM of switch 71. Relay WSCO opens the locking circuit and releases relay WSMW and WSWS. This unautostops the transmitter 38 and at the end of this read pulse relay WSCO releases the sequence switch 71 steps to point 18 where it remains during the transmission of the message to the way station.

Each message is terminated with four N's and for certain operational purposes some messages have other characters inserted following the four N's and these characters may be inserted as the message is switched from a receiving to a sending position. For proper operation of the circuits a distinctive character follows the inserted characters after the four N's and in the present embodiment this character is a blank. Thus, the complete end of a message consists of four N's, none or several other characters and the blank.

The four N's are read on relays WSNA, WSNB, WS2N, WS3N and WS4N by obvious circuits similar to those employed to detect the end of message on an incoming message and these relays are operated by a probing circuit through contacts of the pulse relays WS1P to WS5P. Relay WS4N operates on the fourth N and prepares a circuit for the first blank thereafter to operate relay WSBA which in turn operates relay WSBB. The operation of relay WSBA autostops the transmitter by opening the circuit through the right hand coil of relay WSAS by energizing relay WSAC. However, relay WSBB prepares another circuit for the maintenance of the read pulse. The line is therefore closed for one dwell period before the read pulse is passed through contacts of relay WSBB to the step magnet of the sequence switch 71 which had been resting on point 18. On this closure of the read pulse the switch 71 is stepped to point 19 and another dwell period occurs.

At the way stations relays ST and SEL remain operated on the line signals including the four N's and the last character transmitted which was a blank. However, on the two dwell periods following the blank, all ST relays release to prepare circuits for stepping the rotary switches thereat. Following the second dwell, when switch 71 is on point 20, the character O is transmitted. The sequence switch 71 continues to step and while on points 21, 22 and 23 the line is kept closed and as the switch steps to point 24 relay WSDR operates and completes a circuit whereby the switch self-steps to its No. 1 or home position. At this point all other operated relays release. As the switch 71 steps to point 1, relay WSDR releases and prepares a circuit to unautostop the transmitter and since the transmitter can not unautostop until the next step pulse is generated the line is kept closed for at least one more revolution of the distributor 61. Thus, at least four dwell periods are provided following the transmission of the character O to the line.

At the way stations the circuits are established for the operation of the rotary switches 86 thereat and during the two dwell periods following the blank the switches 86 are stepped to point 1 in response to the character O. During the first dwell following the character O the HR relays release to apply a ground to point 1 of the rotary switches and at the selected way station this ground causes the REC relay to release. This applies a holding ground to the printer of the selected station and the following three dwell periods provide sufficient time for the SEL relays at all the way stations to release which in turn operate the RR relays which establish circuits for the self-stopping of the rotary switches 86 to their home positions. Thus at the end of the message from the central office the way stations are all returned to their normal or unselected condition ready to be selected in response to another sequence of signals from the central office.

A number of protective features are provided at the switching center to signal an operator and indicate instances of faulty operation of the equipment. These protective features include the timer 54 with the vacuum tube 73 which is activated when the principal switching sequences are started. If the sequences are not completed within a predetermined length of time, the tube 73 fires to operate lamps 74 and 76. When an invitation sequence is initiated, the initiate lock-out is put on at all the way stations and stays on until the end of the incoming message starts the clearout sequence which removes the lock-out. Should a line hit operate relay WRRR which will start an invitation sequence and there is no message at any of the way stations awaiting transmission, the initiate lockout would remain on except for the automatic arrangement that removes the same. Another situation that would produce the same result would be for a way station to initiate a request which operated relay WRRR at the central office, and then raise the tape arm or open the tape latch before the station is connected to the way circuit. This automatic arrangement consists of no-message relay WRNM and its associated timer including vacuum tube 101. If there is no incoming message awaiting transmission as the invitation sequence is in process, the printer of the selected station and the following three dwell periods provide sufficient time for the SEL relays at all the way stations to release which in turn operate the RR relays which establish circuits for the self-stopping of the rotary switches 86 to their home positions. Thus at the end of the message from the central office the way stations are all returned to their normal or unselected condition ready to be selected in response to another sequence of signals from the central office.

A number of protective features are provided at the switching center to signal an operator and indicate instances of faulty operation of the equipment. These protective features include the timer 54 with the vacuum tube 73 which is activated when the principal switching sequences are started. If the sequences are not completed within a predetermined length of time, the tube 73 fires to operate lamps 74 and 76. When an invitation sequence is initiated, the initiate lock-out is put on at all the way stations and stays on until the end of the incoming message starts the clearout sequence which removes the lock-out. Should a line hit operate relay WRRR which will start an invitation sequence and there is no message at any of the way stations awaiting transmission, the initiate lockout would remain on except for the automatic arrangement that removes the same. Another situation that would produce the same result would be for a way station to initiate a request which operated relay WRRR at the central office, and then raise the tape arm or open the tape latch before the station is connected to the way circuit. This automatic arrangement consists of no-message relay WRNM and its associated timer including vacuum tube 101. If there is no incoming message awaiting transmission as the invitation sequence is in process, the count switch 77 continues stepping, inviting each of the way stations in turn at least once, until it reaches point 8. At this point it applies a ground that keeps the counting relays WRD1 through WRD4 from resetting until the read pulse operates relay WRNM. Relay WRNM in operating locks up and completes a circuit for the operation of relay WRIM which functions as described to complete the invitation sequence. Shortly thereafter, however, tube 101 fires to operate the end-of-message relay WREN, which functions as previously described to initiate the sequence that removes the initiate lockout at the way stations. If relay WRNM is operated two times in succession a circuit is completed for the operation of relay WR3C to complete a circuit to lamp 102. The lighting of lamp 102 indicates to consecutive failures to pick up a message from the way circuit.

Another feature of the system is the arrangement whereby no stations will be cut in by message signals should the transmitter at the central office be stopped momentarily during the transmission of a message by operation of the tape lever thereat. This is effected by keeping the line closed for at least a predetermined length of time once the transmitter stops and includes a vacuum tube 103. If the transmitter is stopped by the operation of the tape lever, relay WSAS operates, which in turn causes operation of relay WSDW. Relay WSDW locks up through itself and starts the timing operation of tube 103. Subsequently tube 103 fires to operate relay WSDC which locks up through relay WSAS and opens the holding circuit to relay WSDW. Tube 103 only fires after a period sufficient to permit the ST and SEL relays at the way stations to operate properly and complete circuits to prevent following message signals from operating their rotary switches.

It will be noted from the circuits at an out station that up until the time the out station is connected to the way circuit in responsce to the actuation of either the high priority or low priority push button, either one or the other of the push buttons can be operated to change the character of the priority request. Thus if an out station has a low priority message and makes a request, any time before the request is answered, the operation of the high priority push button and the substitution of the high priority tape in the transmitter will cause the high priority message to be picked up ahead of low priority messages at any of the other stations.

The central office can cut off any way station during the transmission of a message or at any other time the way station release key 103 which releases relay WREM.

While the invention has been described in but a single preferred embodiment thereof, it will be obvious that various modifications can be made therein without departing from the spirit or essential attributes thereof, and it is desired therefore that only such limitations be placed thereon as are imposed by the appended claims.

What is claimed is:

1. In a telegraph system, a central office, a plurality of remote offices, a duplex way circuit serially connecting said remote offices to said central office and having a transmitting channel and a receiving channel with respect to said central office, permutation code message transmitting and receiving equipments at said offices, means at said central office for transmitting control signals for controlling the operative association of the transmitting and receiving equipments at said remote offices with said way circuit, control signal transmitting means at each of said remote offices operative to transmit signals to initiate the operation of said control signal transmitting means at said central office, means responsive to last-mentioned signals to associate the transmitting equipment at the respective remote office with said receiving channel to transmit a message to the receiving equipment at said central office, and means to effect said association independently of said transmitting and receiving equipments and to record on said message receiving equipment only signals transmitted from said message transmitting equipment.

2. In a telegraph system, a central office, a plurality of remote offices, a duplex way circuit connecting said remote offices to said central office and having a transmitting channel and a receiving channel with respect to said central office, permutation code message transmitting and receiving equipments at said offices, means at said central office for transmitting signals for automatically controlling the operative association of the transmitting and receiving equipments at said remote offices with said way circuit, a plurality of manually operable message priority indicating keys at each of said remote offices, and means at said central office responsive to the operation of any one or more of said keys at said remote offices for transmitting signals to said remote offices to enable the remote office with the highest priority operated key at any one time to transmit to said central office.

3. In a telegraph system, a central office, a plurality of remote offices, a duplex way circuit connecting said remote offices to said central office and having a transmitting channel and a receiving channel with respect to said central office, permutation code message transmitting and receiving equipments at said offices, means at said central office for transmitted signals to said way circuits for controlling the operative association of the transmitting and receiving equipments at said offices with said way circuit, a key at each of said remote offices the operation of which transmits control signals to said central office indicating a message waiting for transmission to said central office over the receiving channel thereto, means at said central office responsive to the reception of said control signals initiated by the actuation of one of said keys to transmit over the sending circuit from said central office other control signals to operatively associate the message transmitting means at the station having an operated key with the receiving channel to said central office and means to record at the message receiving equipment at said central office only the signals transmitted by the message transmitting equipment at said remote office.

4. In a telegraph system a main station, a plurality of remote stations, a circuit arranged for duplex operation connecting said remote stations with said main station, means for transmitting and recording received permutation character code signals at each of said stations, said means normally being operatively disassociated from said circuit, cyclically operable control signal transmitting means at said main station to selectively transmit control signals to associate the transmitting means and receiving means at said remote stations with said circuit, means at each of said remote stations for initiating said last mentioned means into operation to operatively associate the transmitting means thereat and the receiving means at said main station with said circuit and means for effecting said association to record at said message receiving means only signals from said message transmitting means.

5. In a telegraph system a main station, a plurality of remote stations, a circuit arranged for duplex operation connecting said remote stations with said main station, means for transmitting and recording received permutation character code signals at each of said stations normally operatively disassociated from said circuit, control signal transmitting means at said main station for transmitting control signals for controlling the operative association of the transmitting means and the receiving means at said remote stations with said circuit, means at each of said remote stations to transmit other control signals to said main station to cause said control signal transmitting means thereat to transmit signals to operatively associate the transmitting means at a remote station with said circuit for the transmission of a message to the receiving means at said main station, and means for associating said remote office permutation character code transmitting means with said circuit one at a time when more than one of the said control signal transmitting means at said remote stations are operated.

6. In a telegraph system a main station, a plurality of remote stations, a circuit arranged for duplex operation connecting said remote stations with said main station, means for transmitting and recording received permutation character code signals at each of said stations normally operatively disassociated from said circuit, means at each of said remote station for transmitting request control signals to said main station for the operative association of the transmitting means thereat with said circuit for the transmission of a message to said main station, means at said main station operative in response to said request control signals to transmit to said circuit other control signals to operatively associate the transmitting means at the station making the request with said circuit, and means for permutation character code recording on the recording means at said main station only signals transmitted from the permutation character code transmitting means at said remote offices.

7. In a telegraph system a main station, a plurality of remote stations, a circuit arranged for duplex operation connecting said remote stations with said main station, means for transmitting and recording received permutation character code signals at each of said stations normally operatively disassociated from said circuit, means at each of said remote stations for transmitting request control signals to said main station for the operative association of the transmitting means thereat with said circuit to enable the transmission of a message to said main station, means at said main station operative in response to said request control signals to transmit to said circuit other control signals to operatively associate the permutation character code transmitting means at the station making the request with said circuit, means for recording on the permutation character code recording means at said main station only signals transmitted from the permutation character code transmitting means at said remote stations, and means operative when a request for transmission is made during transmission from another remote station to said main station to register said request and transmit control signals when the circuit becomes idle.

8. In a telegraph system a main station, a plurality of remote stations, a circuit arranged for duplex operation connecting said remote stations with said main station, means for transmitting and recording received permutation character code signals at each of said stations normally operatively disassociated from said circuit, means at each of said remote stations for transmitting connection request control signals to said main station for the operative association of the transmitting means thereat with said circuit for the transmission of a message to said main station, means at said main station operative in response to said connection request control signals to transmit to said circuit control signals to operatively associate the permutation character code transmitting means at the station making the request with said circuit, means for recording on the permutation character code recording means at said main station only signals transmitted from the permutation character code transmitting means at said remote offices, and means, operative when a plurality of connection requests are made during other transmission to said main station over said circuit to register said requests and transmit said control signals in turn to the stations having made said requests.

9. In combination, a main station, a plurality of remote stations, a circuit arranged for duplex operation connecting said remote stations to said main station, message transmitting means at said remote stations and message recording means at said main station, means at said remote stations to register requests for use of the circuit to transmit messages to the main station, means at said main station responsive to said requests to transmit invitation-to-transmit sequence signals to said remote stations, and means at said remote stations making said requests and responsive to said signals for initiating operation of the message transmitting means thereat one at a time to transmit messages to said main station.

10. In combination, a main station, a plurality of remote stations, a circuit arranged for duplex operation connecting said remote stations to said main station, message transmitting means at said remote stations and message recording means at said main station, means at said remote stations to register requests for use of the circuit to transmit messages to the main station, means at said main station responsive to said requests to transmit invitation-to-transmit sequence signals to said remote stations, means at said remote stations making said requests and responsive to said signals for initiating operation of the message transmitting means thereat one at a time to transmit messages to said main station, and means for answering a request to transmit from each one of the requesting remote stations before answering a second request from the same remote station.

11. In combination, a main station, a plurality of remote stations, a circuit arranged for duplex operation connecting said remote stations to said main station, message transmitting means at said remote stations and message recording means at said main station, means at said remote stations to register requests for use of the circuit to transmit messages to the main station, said means including means to indicate messages of different priority, means at said main station responsive to said requests to transmit invitation-to-transmit signals to said remote stations to initiate operation of the message transmitting means thereat one at a time, and means for initiating operation of the message transmitting means at the requesting stations having the highest priority messages before initiating operation of the message transmitting means at the stations having lower priority messages.

12. In combination, a main station, a plurality of remote stations, a circuit arranged for duplex operation connecting said remote stations to said main station, message transmitting means at said remote stations and message recording means at said main station, means at said remote stations to register requests for use of the circuit to transmit messages to the main station, said means including means to indicate messages of different priority, means at said main station responsive to said requests to transmit invitation-to-transmit signals to said remote stations to initiate operation of the message transmitting means thereat one at a time, means for initiating operation of the message transmitting means at the stations having the highest priority messages before initiating operation of the message transmitting means at the stations having lower priority messages, and means for recording on the message receiving means at said main station only the signals from the message transmitting means of said remote stations.

13. In combination, a main station, a plurality of remote stations, a circuit arranged for duplex operation connecting said remote stations to said main station, message transmitting means at said remote stations and message recording means at said main station, means at said remote stations to register requests for use of the circuit to transmit messages to the main station, said means including means to indicate messages of different priority, means at said main station responsive to said requests to transmit invitation-to-transmit signals to said remote stations to initiate operation of the message transmitting means thereat one at a time, means for initiating operation of the message transmitting means at the stations having the highest priority messages before initiating operation of the message transmitting means at the stations having lower priority messages, and means for answering all high priority message requests from said remote stations in turn before answering a lower priority message request from the same or others of said remote stations.

14. In combination, a main station, a plurality of remote stations, a circuit arranged for duplex operation connecting said remote stations to said main station, message transmitting means at said remote stations and message recording means at said main station, means at said remote stations to register requests for use of the circuit to transmit messages to the main station, said means including means to indicate messages of different priority, means at said main station responsive to said requests to transmit invitation-to-transmit signals to said remote stations to initiate operation of the message transmitting means thereat one at a time, means for initiating operation of the transmitting means at the stations having the highest priority messages before initiating operation of the transmitting means at the stations having lower priority messages, and means for giving each remote station an opportunity to transmit a high priority message before a second opportunity to transmit a message is given a remote station.

15. In combination, a main station, a plurality of remote stations, a circuit arranged for duplex operation connecting said remote stations to said main station, message transmitting means at said remote stations and message recording means at said main station, means at said remote stations to register requests for use of the circuit to transmit messages to the main station, means at said main station responsive to said requests to transmit invitation-to-transmit sequence signals to said remote stations, means at said remote stations making said requests and responsive to said signals for initiating operation of the transmitting means thereat one at a time to transmit messages to said main station, and means for transmitting said invitation-to-transmit sequences to said circuit only in response to requests from one or more remote stations therefor.

16. In combination, a main station, a plurality of remote stations, a circuit arranged for duplex operation connecting said remote stations with said main station, message permutation character code transmitting means and message permutation character code recording means at each of said stations, means at said main station for controlling the operative association of said message transmitting means and said message recording means with said circuit to transmit and receive messages thereover, means at said remote stations to request the main station for a connection to said circuit for message transmission, means responsive to said request to transmit signals to said remote station to connect the message transmitting means thereat to said circuit, means to halt the transmission of message signals from said main station to said circuit during the transmission of said control signals to said remote stations, and means independently of said message receiving means to record only message signals thereon.

17. In combination, a main station, a plurality of remote stations, a circuit arranged for duplex operation connecting said remote stations with said main station, message permutation character code transmitting means and message permutation character code recording means at each of said stations, means at said main station for controlling the operative association of said message transmitting means and said message recording means with said circuit to transmit and receive messages thereover, means at said remote stations to transmit a request signal to said main station for a connection to said circuit for message transmission, said request signal being of less length than one character code and operative to cause said main station to transmit remote station connection control signals to said circuit, and means responsive to said connection control signals to connect the transmitting means at the station originating the request to said circuit for the transmission of a message to said main station.

18. In combination, a main station, a plurality of remote stations, a circuit arranged for duplex operation connecting said remote stations with said main station, message permutation character code transmitting means and message permutation character code recording means at each of said stations, means at said main station for controlling the operative association of said transmitting means and said recording means with said circuit to transmit and receive thereover, means responsive to an open line condition of less length than one character code on the receiving channel to said main station to initiate the transmission of invitation-to-transmit signals over the sending channel from said main station to said remote stations in turn, an alarm device and means for operating said alarm device on the transmission of a predetermined number of said invitation-to-transmit signals to said channel with no response thereto.

19. In combination, a main station, a plurality of remote stations, a circuit arranged for duplex operation connecting said remote stations with said main station, message permutation character code transmitting means and message permutation character code recording means at each of said stations, means at said main station for controlling the operative association of said transmitting means and said recording means with said circuit to transmit and receive thereover, means at said remote stations for requesting the main station for a connection thereto and to indicate the priority of messages to be transmitted, and means at said main station responsive to said requests to determine the priority of messages waiting transmission thereto and effect connection of the transmitting means at said remote stations to said circuit in a manner corresponding to the priority of the messages thereat waiting transmission.

20. In combination, a main station, a plurality of remote stations, a circuit arranged for duplex operation connecting said remote stations with said main station, message permutation character code transmitting means and message permutation character code recording means at each of said stations, means at said main station for controlling the operative association of said remote station message transmitting means and said recording means with said circuit to transmit and receive thereover, means at said remote stations for requesting the main station for a connection thereto and to indicate the priority of messages to be transmitted, means at said main station responsive to said requests to determine on a non-sequential basis if one or more of said remote stations have a high priority message to transmit and to connect any of the remote stations having high priority messages in turn with said main station and thereafter connect in turn any of the remote stations having lower priority messages with said main station.

References Cited in the file of this patent

UNITED STATES PATENTS

| | | |
|---|---|---|
| 2,599,344 | Oberman | June 3, 1952 |
| 2,667,533 | Zenner | Jan. 26, 1954 |
| 2,805,283 | Stiles | Sept. 3, 1957 |